US012404624B2

(12) United States Patent
Kim et al.

(10) Patent No.: US 12,404,624 B2
(45) Date of Patent: Sep. 2, 2025

(54) WASHING MACHINE

(71) Applicant: Samsung Electronics Co., Ltd., Suwon-si (KR)

(72) Inventors: Dong Young Kim, Seoul (KR); Adam Wishney, Singapore (SG); Doo Young Ryu, Suwon-si (KR); In Ju Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/482,500

(22) Filed: Oct. 6, 2023

(65) Prior Publication Data

US 2024/0035227 A1 Feb. 1, 2024

Related U.S. Application Data

(63) Continuation of application No. 18/145,401, filed on Dec. 22, 2022, now Pat. No. 11,814,779, which is a (Continued)

(30) Foreign Application Priority Data

Feb. 25, 2015 (KR) ........................ 10-2015-0026854

(51) Int. Cl.
*D06F 39/14* (2006.01)
*D06F 34/28* (2020.01)
(Continued)

(52) U.S. Cl.
CPC .............. *D06F 39/14* (2013.01); *D06F 34/28* (2020.02); *D06F 37/28* (2013.01); (Continued)

(58) Field of Classification Search
CPC ........ D06F 39/14; D06F 39/005; D06F 37/28; D06F 37/10; D06F 37/42; D06F 34/28; (Continued)

(56) References Cited

U.S. PATENT DOCUMENTS

| | | | | |
|---|---|---|---|---|
| 3,042,471 A | | 7/1962 | Haslup | |
| 3,857,625 A | * | 12/1974 | Crane | E05D 11/0081 439/31 |

(Continued)

FOREIGN PATENT DOCUMENTS

| | | |
|---|---|---|
| CN | 1746413 A | 3/2006 |
| CN | 1763295 A | 4/2006 |

(Continued)

OTHER PUBLICATIONS

KR101155004 translation (Year: 2012).*
(Continued)

*Primary Examiner* — Hiwot E Tefera
(74) *Attorney, Agent, or Firm* — Jefferson IP Law, LLP

(57) ABSTRACT

Disclosed is a washing machine having a cabinet forming an outer appearance and having an inlet port formed at the front, a tub provided inside the cabinet for storing wash water, a drum provided inside the tub to be rotatable, and a door installed in the cabinet for opening and closing the inlet port. The door is provided with an auxiliary door which can be freely opened and closed during the washing process independently of the door, so that laundry can be added even during the washing process.

7 Claims, 33 Drawing Sheets

Related U.S. Application Data continuation of application No. 17/336,897, filed on Jun. 2, 2021, now Pat. No. 11,566,367, which is a continuation of application No. 15/553,780, filed as application No. PCT/KR2016/001599 on Feb. 17, 2016, now Pat. No. 11,053,629.

(51) Int. Cl.

| | |
|---|---|
| ***D06F 37/28*** | (2006.01) |
| ***E05D 11/00*** | (2006.01) |
| *D06F 37/06* | (2006.01) |

(52) U.S. Cl.

CPC .......... *E05D 11/0081* (2013.01); *D06F 37/06* (2013.01); *E05Y 2900/312* (2013.01)

(58) Field of Classification Search

CPC .......... D06F 34/10; D06F 39/12; D06F 37/06; D06F 37/22; D06F 39/02; D06F 39/085; D06F 39/088; E05D 11/0081; E05Y 2900/312; F25D 2400/40

See application file for complete search history.

(56) References Cited

U.S. PATENT DOCUMENTS

| | | | | |
|---|---|---|---|---|
| 3,883,201 | A | 5/1975 | Busoni | |
| 4,445,299 | A | 5/1984 | Lehikoinen et al. | |
| 5,666,764 | A | 9/1997 | Beatty et al. | |
| 5,724,837 | A | 3/1998 | Shin | |
| 6,363,755 | B1 | 4/2002 | Hapke et al. | |
| 9,279,205 | B2 | 3/2016 | Chung et al. | |
| 2004/0083769 | A1 | 5/2004 | Kim et al. | |
| 2004/0206106 | A1* | 10/2004 | Lee | F25D 23/126 62/389 |
| 2006/0017361 | A1 | 1/2006 | Rendel et al. | |
| 2006/0064846 | A1* | 3/2006 | Espindola | E05D 7/081 16/223 |
| 2007/0130730 | A1 | 6/2007 | Cho et al. | |
| 2010/0077803 | A1 | 4/2010 | Lim et al. | |
| 2010/0176701 | A1 | 7/2010 | Oberhauser et al. | |
| 2010/0212957 | A1 | 8/2010 | Hotz et al. | |
| 2011/0120195 | A1 | 5/2011 | Jeoung et al. | |
| 2011/0234074 | A1 | 9/2011 | Dolinsek et al. | |
| 2012/0242207 | A1 | 9/2012 | Mershon et al. | |
| 2014/0157676 | A1 | 6/2014 | Kim | |
| 2014/0210328 | A1 | 7/2014 | Akalan et al. | |
| 2015/0015001 | A1 | 1/2015 | Fabbro et al. | |
| 2015/0123523 | A1 | 5/2015 | Woo et al. | |
| 2015/0211167 | A1 | 7/2015 | Kim et al. | |
| 2015/0292135 | A1 | 10/2015 | Wishney et al. | |
| 2016/0123055 | A1* | 5/2016 | Ueyama | F25D 23/028 312/405 |
| 2016/0194802 | A1 | 7/2016 | Heo et al. | |
| 2016/0201251 | A1 | 7/2016 | Zhang et al. | |
| 2016/0251883 | A1 | 9/2016 | Wang et al. | |
| 2017/0159229 | A1 | 6/2017 | Park et al. | |
| 2017/0306551 | A1 | 10/2017 | Kim et al. | |
| 2018/0038040 | A1 | 2/2018 | Kim et al. | |
| 2018/0073180 | A1 | 3/2018 | Jo et al. | |
| 2018/0127911 | A1 | 5/2018 | Chen et al. | |
| 2018/0135219 | A1 | 5/2018 | Frantz et al. | |
| 2018/0142399 | A1 | 5/2018 | Chun et al. | |
| 2018/0340286 | A1 | 11/2018 | Kim et al. | |

FOREIGN PATENT DOCUMENTS

| | | | | | |
|---|---|---|---|---|---|
| CN | 1769575 | A | | 5/2006 | |
| CN | 101086194 | A | * | 12/2007 | |
| CN | 101978109 | A | | 2/2011 | |
| CN | 102388175 | A | | 3/2012 | |
| CN | 103526508 | A | | 1/2014 | |
| CN | 104328963 | A | * | 2/2015 | |
| DE | 2261275 | A1 | | 5/1974 | |
| DE | 4203117 | A1 | * | 8/1992 | |
| DE | 10 2009 002 776 | A1 | | 11/2010 | |
| EP | 1 389 643 | A2 | | 2/2004 | |
| EP | 1 389 643 | A3 | | 9/2004 | |
| EP | 2415920 | A1 | | 2/2012 | |
| EP | 2 634 304 | A1 | | 9/2013 | |
| EP | 2 743 393 | A1 | | 6/2014 | |
| EP | 2808434 | A1 | | 12/2014 | |
| GB | 1427420 | A | | 3/1976 | |
| GB | 2252789 | A | * | 8/1992 | E05D 11/0081 |
| JP | 7-260339 | | * | 10/1995 | |
| KR | 10-2004-0015480 | A | | 2/2004 | |
| KR | 10-2006-0023016 | A | | 3/2006 | |
| KR | 10-2006-0039184 | A | | 5/2006 | |
| KR | 10-2007-0096612 | A | | 10/2007 | |
| KR | 10-0776593 | A | | 11/2007 | |
| KR | 10-2009-0096948 | A | | 9/2009 | |
| KR | 10-2009-0100154 | A | | 9/2009 | |
| KR | 101155004 | B1 | * | 6/2012 | |
| KR | 10-2015-0006264 | A | | 1/2015 | |
| WO | 03029590 | A1 | | 4/2003 | |
| WO | 2015/021725 | A1 | | 2/2015 | |

OTHER PUBLICATIONS

DE4203117 translation (Year: 1992).*

JP7-260339 translation (Year: 1995).*

CN101086194 translation (Year: 2007).*

European Search Report dated Oct. 10, 2023, issued in European Application No. 23186946.2.

Chinese Office Action dated Apr. 3, 2019, issued in a counterpart Chinese application No. 201680023835.6.

Extended European Search Report dated Aug. 5, 2019, issued in a counterpart European application No. 19166584.3-1018.

Chinese Office Action dated May 27, 2020, issued in Chinese Application No. 201680023835.6.

Korean Office Action dated May 20, 2020, issued in Korean Application No. 10-2015-0026854.

Korean Office Action dated Aug. 11, 2020, issued in Korean Application No. 10-2020-0059850.

Korean Office Action dated Dec. 10, 2020, issued in Korean Application No. 10-2020-0059850.

Korean Office Action dated Feb. 5, 2021, issued in Korean Application No. 10-2020-0059850.

Korean Office Action dated May 5, 2021, issued in Korean Application No. 10-2021-0002231.

English translation for KR20150006264 (Year: 2015).

Communication pursuant to Rule 71(3) EPC dated Aug. 31, 2018, issued in the European patent application No. 16 755 806.3.

Korean Office Action with English translation dated May 16, 2022; Korean Appln. No. 10-2022-0023939.

Chinese Office Action with English translation dated Sep. 5, 2022; Chinese Appln. No. 202110076534.2.

Chinese Notification of Fulfilling of Registration Formality dated Feb. 2, 2023; Chinese Appln. No. 202110076534.2.

European Communication under Rule 71(3) EPC dated Mar. 27, 2023; European Appln. No. 19 166 584.3-1017.

Korean Office Action with English translation dated Aug. 7, 2023; Korean Appln. No. 10-2023-0024650.

European Office Action dated Feb. 19, 2025, issued in a European Patent Application No. 23 186 946.2.

* cited by examiner

WASHING MACHINE

CROSS-REFERENCE TO RELATED APPLICATION(S)

This application is a continuation application of prior application Ser. No. 18/145,401, filed on Dec. 22, 2022, which is a continuation application of prior application Ser. No. 17/336,897, filed on Jun. 2, 2021, which has issued as U.S. Pat. No. 11,566,367 on Jan. 31, 2023, which is a continuation application of prior application Ser. No. 15/553,780, filed on Aug. 25, 2017, which has issued as U.S. Pat. No. 11,053,629 on Jul. 6, 2021 and is a U.S. National Stage application under U.S.C. § 371 of an International application number PCT/KR2016/001599, filed on Feb. 17, 2016, which is based on and claims priority of a Korean patent application number 10-2015-0026854, filed on Feb. 25, 2015, in the Korean Intellectual Property Office, the disclosure of which is incorporated by reference herein in its entirety.

TECHNICAL FIELD

Embodiments of the present disclosure relate to a washing machine, and more particularly, to a washing machine having an auxiliary door such that laundry can be input without opening a main door during a washing cycle.

BACKGROUND ART

Generally, a washing machine is an appliance for washing clothes using electric power. The washing machine includes a drum type washing machine for washing laundry by raising the laundry upward and dropping the laundry while rotating a rotary tub, and an electric washing machine for washing laundry by using the water flow generated by a pulsator when a washing tub is rotating.

The drum type washing machine includes a cabinet for forming an outer appearance, a cylindrical tub installed in the cabinet for containing wash water, a drum rotatably installed in the tub to wash the laundry, a driving motor disposed behind the tub for rotating the drum, and a door installed on the front of the cabinet. At least a part of the cabinet is provided with an inlet port communicating with the drum, and the door opens and closes the inlet port.

Since the inlet and the door of the drum type washing machine are provided on the front surface of the cabinet, when the wash water is supplied to the tub, the door cannot be opened after the washing of the laundry is started. Therefore, the wash water cannot be added to the tub when wash water is supplied to the tub and washing cycle is in progress.

DISCLOSURE

Technical Problem

Since the inlet and the door of the drum type washing machine are provided on the front surface of the cabinet, when the wash water is supplied to the tub, the door cannot be opened after the washing of laundry is started. Therefore, the wash water cannot be added to the tub when wash water is supplied to the tub and washing cycle is in progress.

Technical Solution

Therefore, it is an aspect of the present disclosure to provide a washing machine having an improved structure of enabling laundry and detergent to be put into the washing machine during a washing cycle without restraint.

One aspect of the present disclosure discloses a washing machine provided with an additional washing space in addition to a washing space provided in a conventional drum.

One aspect of the present disclosure discloses an auxiliary door locking structure capable of locking an auxiliary door.

One aspect of the present disclosure discloses an auxiliary door hinge structure that alleviates an impact generated when an auxiliary door is opened and closed and fixes the auxiliary door when the auxiliary door is opened and closed.

In accordance with one aspect of the present disclosure, a washing machine includes a cabinet, a tub, a drum and a door. The cabinet may form an external appearance of the washing machine, and may be provided at a front side thereof with an inlet port. The tub may be provided in the cabinet and accommodate wash water. The drum may be rotatably provided in the tub. The door may be installed at the cabinet to open and close the inlet port. The door may be provided with an auxiliary door that is freely opened and closed independent of the door during a washing cycle.

The auxiliary door may be provided at the door so as to protrude forward.

The auxiliary door may be opened and closed upward and downward.

The door may be provided at the inside thereof with an auxiliary inlet port that may be opened and closed by the auxiliary door and with a connection part connecting the auxiliary inlet port to the drum.

The connection part may be inclined downward while extending to the inside of the door.

The door may include a front housing at which the auxiliary door may be provided and a rear housing that may be coupled to the front housing to form the connection part in the door and may be provided at a rear side thereof with an opening part communicating with the drum.

The rear housing may protrude backward of the door, and a degree of the rear housing being protruded may be decreased upward.

At least one of the auxiliary door and the auxiliary inlet port may have a diaphragm installed thereon to prevent water leakage.

The auxiliary door may remain in a locked state during a washing process, and when the locked state of the auxiliary door is released, the drum may stop rotating.

In accordance with another aspect of the present disclosure, a washing machine includes a cabinet, a tub, a drum and a door. The cabinet may form an external appearance of the washing machine, and may be provided at a front side thereof with an inlet port. The tub may be provided in the cabinet and may accommodate wash water. The drum may be rotatably provided in the tub, and may have a main washing space in which laundry may be washed. The door may be installed on the cabinet to open and close the inlet port. The door may be provided at the inside thereof with an auxiliary washing space in which a washing operation may be performed independent of performing a washing operation in the main washing space.

The door may be provided at a front side thereof with an auxiliary door to open and close the auxiliary washing space.

The door may include a front housing at which the auxiliary door may be provided and a rear housing that may be coupled to the front housing to form the auxiliary washing space in the door and may be provided at a rear side thereof with an opening part communicating with the drum.

The auxiliary door may be provided at an upper portion of the front housing to be opened and closed upward and downward. The auxiliary washing space may be inclined downward while extending to the inside of the door.

The door may further include a cover detachably coupled to the opening part. The cover may be coupled to the opening part to form the auxiliary washing space that is divided from the main washing space.

The cover may have a pulsator installed thereon to form a flow of wash water stored in the auxiliary washing space.

At least one of the opening part and the cover may have a diaphragm installed thereon to prevent water leakage.

In accordance with another aspect of the present disclosure, a washing machine includes a cabinet having an inlet port; a main door rotatably coupled to the cabinet by a hinge member to open and close the inlet port; an auxiliary door rotatably coupled to the main door to input laundry into the cabinet when the main door is closed; a power source provided in the cabinet; a locking device provided in the main door to lock the auxiliary door and operated by being supplied with power from the power source; and an electric wire to connect the power source and the locking device through the hinge member.

The auxiliary door may include a latch in which a locking hole is formed, and the locking device may include a locking bar inserted into the locking hole to lock the auxiliary door and a driving unit to drive the locking bar.

The main door may include a door cover; a door holder; and a glass member coupled between the door cover and the door holder, and the auxiliary door may be coupled to the door cover, and the locking device may be mounted on the door holder.

The door cover may be formed with a latch passing hole through which the latch passes so as to approach the locking device.

A wire passage through which the electric wire passes is formed inside the hinge member.

The hinge member may include a cabinet coupling portion coupled to the cabinet; a hinge arm protruding from the cabinet coupling portion; and a hinge shaft protruding from the hinge arm to support the main door rotatably.

The wire passage may include a first wire passage penetrating the inside of the cabinet coupling portion; a second wire passage formed on the hinge arm so as to open at one surface thereof; and a third wire passage penetrating the inside of the hinge shaft.

A wire cover may be coupled to one open surface of the second wire passage.

The washing machine may further include a connector to connect a first wire connected to the power source and a second wire connected to the locking device, and the hinge member may include a connector receiving groove formed in a back surface of the cabinet coupling portion to receive the connector.

The hinge member may include a fixed rib protruding from an inner surface of the connector receiving groove to fix the connector.

The hinge member may include a moisture permeation preventing rib formed on the upper side of the connector receiving groove to prevent moisture from penetrating into the connector.

In accordance with another aspect of the present disclosure, a washing machine includes a cabinet having an inlet port; a main door rotatably coupled to the cabinet to open and close the inlet port; an auxiliary door rotatably coupled to the main door to input laundry into the cabinet when the main door is closed; a power source provided in the cabinet; a locking device provided in the main door to lock the auxiliary door and operated by being supplied with power from the power source; and a mounting connector having a plug mounted on one of the cabinet and the main door and a socket mounted on the other, and the plug and the socket may be connected according to whether the main door is opened or closed.

When the main door is opened, the plug and the socket are separated, and when the main door is closed, the plug and the socket are connected.

The mounting connector may include a sealing member to prevent moisture from penetrating into the plug and the socket while the plug and the socket are connected to each other.

The washing machine may further comprise a controller to determine whether the main door is opened or closed according to whether the plug is connected to the socket.

The plug and the socket each may include a plurality of connection terminals mutually connected at the time of connection of the plug and the socket, and at least one of the plurality of connection terminals transmits a signal for transmitting whether the main door is opened or closed.

In accordance with another aspect of the present disclosure, a washing machine includes a cabinet having a cabinet front plate on which an inlet port is formed; a main door rotatably coupled to the cabinet to open and close the inlet port; an auxiliary door rotatably coupled to the main door to input laundry into the cabinet when the main door is closed; and a locking device provided on the cabinet front plate to lock the auxiliary door.

The auxiliary door may include a latch in which a locking hole is formed, and the locking device may include a locking bar inserted into the locking hole to lock the auxiliary door and a driving unit to drive the locking bar.

The main door may include a door cover; a door holder; and a glass member coupled between the door cover and the door holder, and the auxiliary door may be coupled to the door cover.

The door cover and the door holder each have a latch passing hole through which the latch passes to approach the locking device.

The locking device may be mounted on the back surface of the cabinet front plate, and a latch passing hole may be formed in the cabinet front plate so that the latch passes therethrough and approaches the locking device.

The auxiliary door may include a push rod, and the main door may include a lever which is pressed by the push rod and rotates when the auxiliary door is closed and in which a restricting hole is formed, and the locking device may include a locking bar inserted into the restricting hole to lock the auxiliary door by restricting the lever and a driving unit to drive the locking bar.

The lever may include a rotating shaft portion; an input portion extending in one direction from the rotating shaft portion and being pressed by the push rod; a restricting portion extending in another direction from the rotating shaft portion having the restricting hole formed therein; and a locking portion extending in still another direction from the rotating shaft portion and locking the auxiliary door by restricting the push rod in a state in which the lever is locked.

The push rod may include a pressing portion to press the input portion and an interference portion to be interfered by the locking portion.

In accordance with an aspect of the present disclosure, a door of a washing machine which opens and closes the inlet port formed in the cabinet includes a door cover having an auxiliary inlet port; a door holder coupled to the rear of the door cover having a rear opening corresponding to the auxiliary inlet port; a glass member coupled between the door cover and the door holder; a chute having a passage extending rearward from the auxiliary inlet port; an auxiliary door coupled to the door cover to open and close the auxiliary inlet port; and a hinge unit to support the auxiliary door.

The hinge unit may include a shock absorber to buffer an impact when opening and closing the auxiliary door.

The shock absorber may include a rotating shaft to rotate together with the auxiliary door having a hollow portion; a fixed shaft inserted into the hollow portion and coupled to the main door; and a buffer spring connected to the rotating shaft and the fixed shaft to apply an elastic force to the rotating shaft.

The hinge unit may include a fixing unit to fix the auxiliary door when the auxiliary door is opened or closed at a predetermined angle.

The fixing unit may include a rotating shaft which rotates together with the auxiliary door and has a hollow portion formed with an engaging hole on a circumferential surface thereof; a fixed shaft inserted into the hollow portion and coupled to the main door; an engaging member inserted into the engaging hole to fix the auxiliary door when the auxiliary door rotates at a predetermined angle; and an engaging spring which applies an elastic force to the engaging member in the direction of the engaging hole.

Advantageous Effect

According to the idea of the present disclosure, the user can open and close the auxiliary door at any time during the laundry process, and freely input laundry, detergent, etc.

According to the idea of the present disclosure, the washing machine is provided with an auxiliary washing space separated from the main washing space, so that it is possible to separate and wash according to the type of laundry, thereby reducing the degree of damage of the laundry.

According to the idea of the present disclosure, the auxiliary door can be locked to prevent the auxiliary door from being opened in an unintended situation.

According to the idea of the present disclosure, when the impact generated when the auxiliary door is opened and closed is buffered and the auxiliary door is fixed when the auxiliary door is opened and closed, the ease of use and the quality of sensibility can be improved.

MODE FOR DISCLOSURE

Hereinafter, preferred embodiments of the present disclosure will be described in detail with reference to the accompanying drawings.

Figure 1:
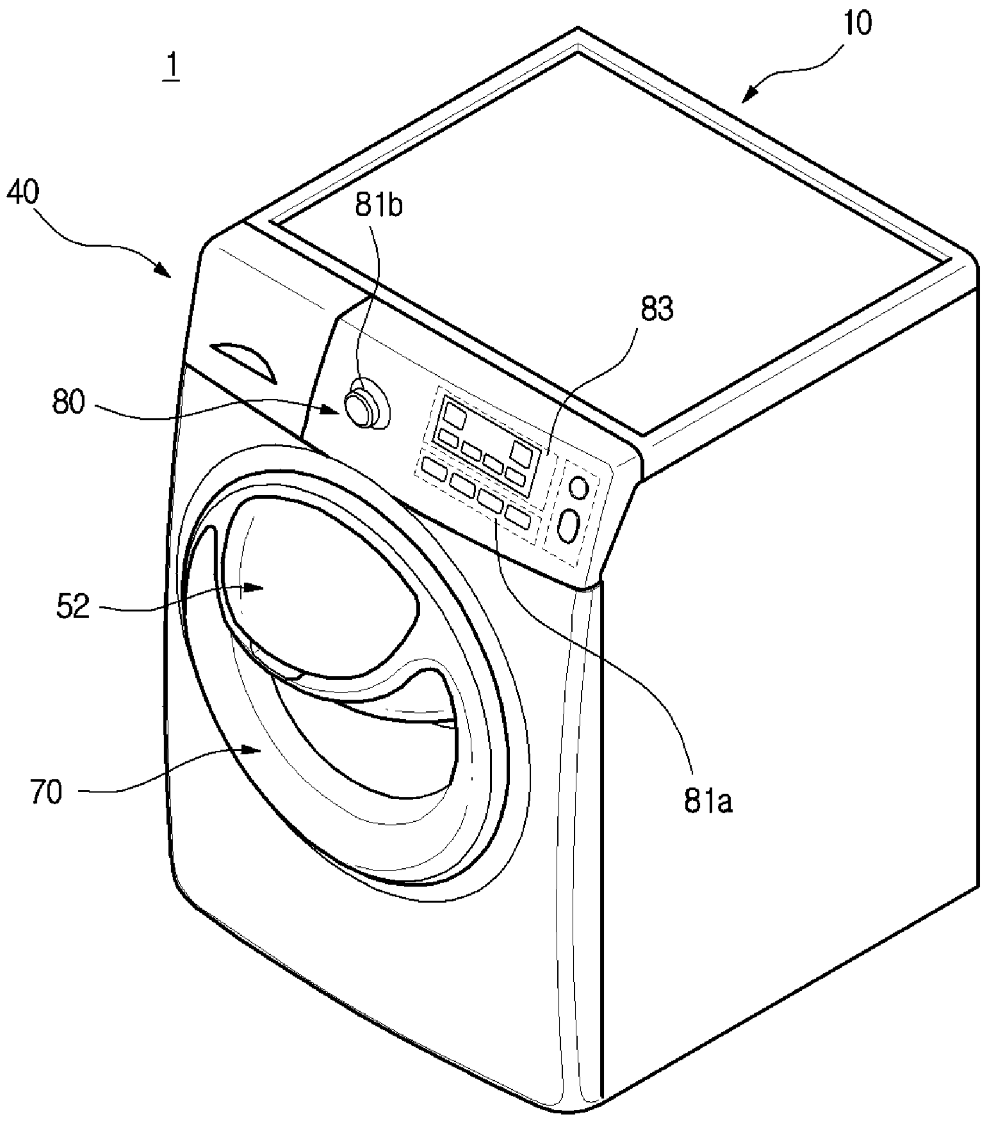
FIG. 1 is a perspective view illustrating the external appearance of a washing machine in accordance with a first embodiment of the present disclosure.
Figure 2:
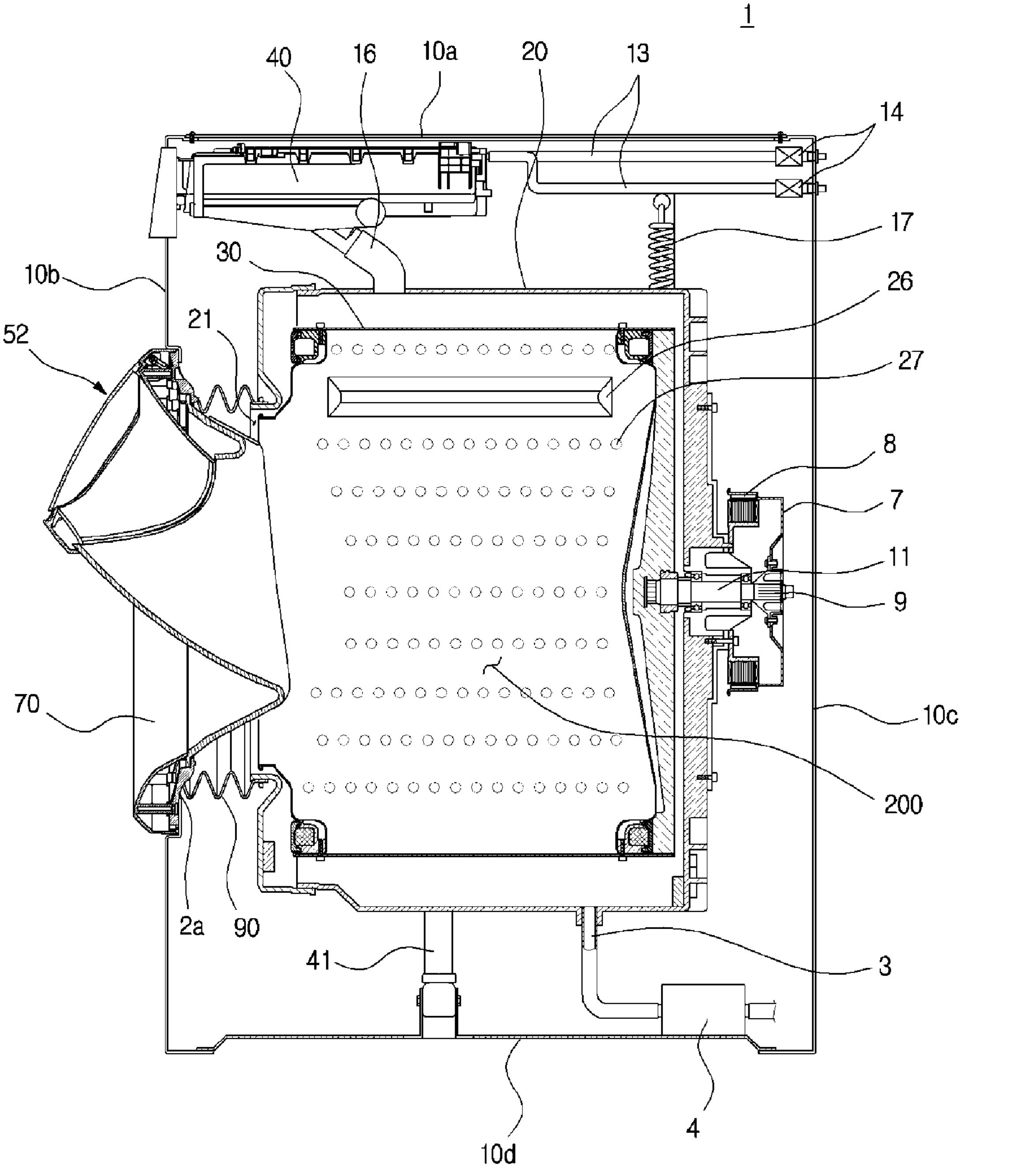
FIG. 2 is a cross-sectional view of the washing machine in accordance with the first embodiment of the present disclosure.
Figure 3:
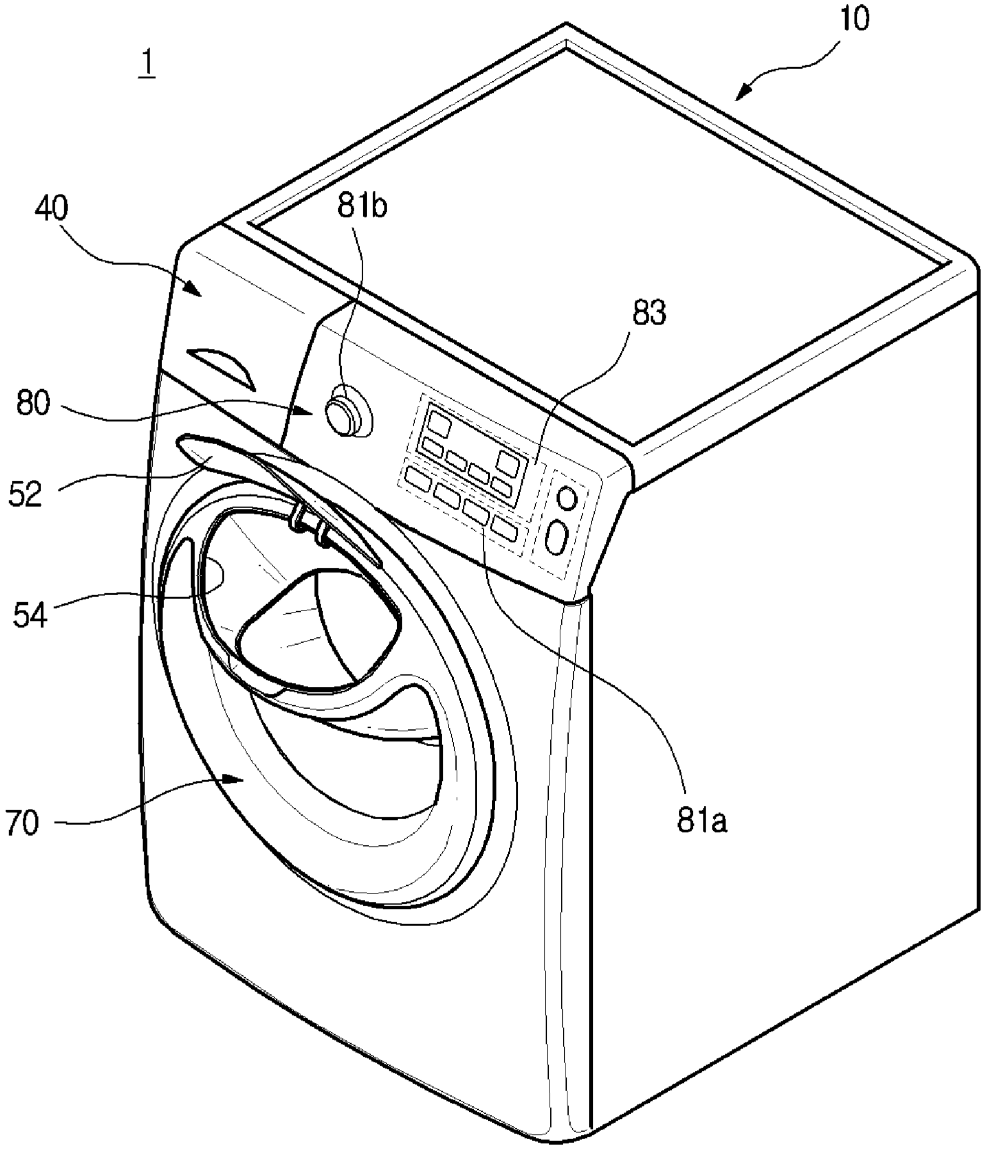
FIG. 3 is a perspective view illustrating a state in which an auxiliary door of the washing machine is open in accordance with the first embodiment of the present disclosure.
Figure 4:
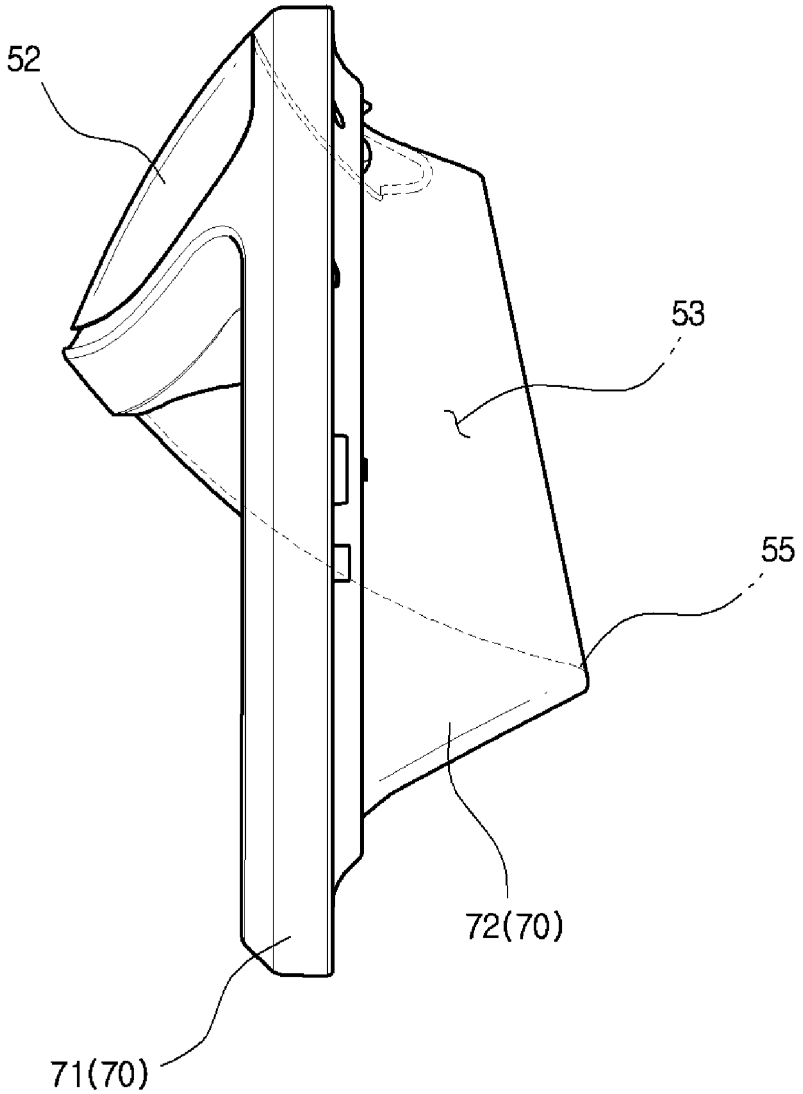
FIG. 4 is a side view illustrating a door of the washing machine in accordance with the first embodiment of the present disclosure.

FIG. 1 is a perspective view illustrating the external appearance of a washing machine in accordance with an embodiment of the present disclosure, FIG. 2 is a cross-sectional view of the washing machine in accordance with an embodiment of the present disclosure, FIG. 3 is a perspective view illustrating a state in which an auxiliary door of the washing machine is open in accordance with an embodiment of the present disclosure, and FIG. 4 is a side view illustrating a door of the washing machine in accordance with an embodiment of the present disclosure.

Referring to FIGS. 1 to 4, a washing machine 1 according to an embodiment of the present disclosure includes a cabinet 10 forming the external appearance of the washing machine 1, a tub 20 accommodating wash water or rinse water that are used for a washing cycle or a rinsing cycle, a drum 30 accommodating laundry, and a driving motor 7 rotating the drum 30.

The cabinet 10 is provided with a control panel 80 including input parts 81*a* and 81*b* to receive an operation command of the washing machine 1 and a display part 83 to display operation information of the washing machine 1.

The input parts 81*a* and 81*b* may receive user's commands related to operations of the washing machine 1, for example, a time of a washing process, a frequency of rinsing operations, a time of a spin dry operation, a time of a dry operation, and a start/pause, and the input parts 81*a* and 81*b* may be implemented using a press—in type button 81*a* or a rotary type button 81*b*. In addition, the display part 83 may display information about operations of the washing machine 1, for example, the amount of wash water, a cycle being in operation by the washing machine 1 and a time remaining until washing is finished, and the display part 83 may be implemented using a liquid crystal display (LCD) panel and a light emitting diode (LED) panel.

Although the washing machine 1 according to the embodiment of the present disclosure includes the input parts 81*a* and 81*b* separately from the display part 83, the present disclosure is not limited thereto. For example, an input part and a display part may be integrally formed with each other by using a touch screen panel (TSP).

In addition, the cabinet 10 includes frames 10*a*, 10*b*, 10*c* and 10*d*, made up of the upper surface frame 10*a* forming an upper surface of the cabinet 10, the front surface frame 10*b* forming a front surface of the cabinet 10, the rear surface frame 10*c* forming a rear surface of the cabinet 10, and a side frame (not shown) forming a side surface and a lower surface of the cabinet 10 while connecting the front surface frame to the rear surface frame 10*c*.

The cabinet 10 is provided with an inlet port 2*a* through which laundry is put into the drum 30. The inlet port 2*a* is opened and closed by a door 70 installed on the front surface frame 10*b*.

A diaphragm 90 is configured to connect the cabinet 10 to the tub 20. The diaphragm 90 is disposed between the inlet port 2*a* of the front surface frame 10*a* and an opening 21 inside the tub 20, to form a path leading from the inlet port 2*a* of the front surface frame 10*a* to the opening 21, and to reduce vibration transmitted to the front surface frame 10*a* during rotation of the drum 30. In addition, a portion of the diaphragm 90 is disposed between the door 70 and the front surface frame 10*a* to prevent wash water from leaking to the outside of the cabinet 10.

The diaphragm 90 may include an injection molded product formed of thermoplastic elastomer. Since the thermoplastic elastomer has elasticity at room temperature, as with rubber, the diaphragm formed of thermoplastic elastomer may effectively transmit attenuate vibrations from the tub 20 to the front surface frame 10*a* of the cabinet 10.

A spring 17 may be provided between the tub 20 and the cabinet 10 to support the tub 20 upward. The spring 17 serves to mitigate vibration and noise, which may be generated due to movement of the tub 20, by using the elastic force thereof. A water supply pipe 13 is installed above the tub 20 to supply wash water to the tub 20. A water supply valve 14 is installed at one side of the water supply pipe 13.

A detergent supply apparatus 40 is connected to the tub 20 via a connection pipe 16, and water supplied via the water supply pipe 13 is supplied into the tub 20 together with detergent via the detergent supply apparatus 40.

The tub 20 is supported by a damper 41, and the damper 41 connects an inner bottom of the cabinet 10 to an outer surface of the tub 20. In addition, the damper 41 may be positioned at an upper side and left/right sides other than the inner bottom of the cabinet 10 to support the tub 20. At an upper side and a lower side of the tub 20, the damper 41 or the spring 17 may mitigate vibration or impact that may be generated due to vertical movements of the tub 20.

The tub 20 may be supported by at least one damper 41.

A driving shaft 11 is connected to a rear surface of the drum 30 to transmit power from the driving motor 7. A plurality of through-holes 27 are formed through a peripheral surface of the drum 30 to circulate wash water. A plurality of lifters 26 are installed on an inner circumferential surface of the drum 30 such that laundry is lifted and dropped during rotation of the drum 30.

The driving shaft 11 is disposed between the drum 30 and the driving motor 7. One end of the driving shaft 11 is connected to a rear plate of the drum 30, and the other end of the driving shaft 11 extends outside a rear wall of the tub 20. If the driving motor 7 drives the driving shaft 11, the drum 30 connected to the driving shaft 11 rotates about the driving shaft 11.

A bearing housing 8 is installed to the rear wall of the tub 20 so as to rotatably support the driving shaft 11. The bearing housing 8 may be made of aluminum alloy, and may be inserted into the rear wall of the tub 20 when the tub 20 is formed by injection molding. Bearings 9 are disposed between the bearing housing 8 and the driving shaft 11 so that the driving shaft 11 may effectively rotate.

A drainage pump 4 that discharges water in the tub 10 toward an outer side of the cabinet 10, a connection hose 3 that connects the tub 20 and the drainage pump 4 so that water in the tub 20 may flow into the drainage pump 70, and a drainage hose (not shown) that guides water pumped by the drainage pump 4 to the outer side of the cabinet 10 are disposed below the tub 20.

The washing machine 1 may further include an auxiliary door 52 configured to be freely opened and closed during a washing process independent of the door 70.

The auxiliary door 52 may be provided at the door 70 and protrude forward.

The auxiliary door 52 may be provided at the door 70 while adjacent to the upper surface frame 10*a*. In detail, the auxiliary door 52 may be installed at a position higher than a top surface of wash water in order to prevent wash water in a main washing space 50 and an auxiliary washing space 51 from being overflown when the auxiliary door 52 is opened and closed during a washing cycle.

The auxiliary door 52 may be rotatably installed at the door 70.

One side of the auxiliary door 52 may be hinged to the door 70.

When a left side or a right side of the auxiliary door 52 is hinged to the door 70, the auxiliary door 52 may be opened and closed leftward and rightward. When an upper side or a lower side of the auxiliary door 52 is hinged to the door 70, the auxiliary door 52 may be opened and closed upward and downward. Preferably, an upper side of the auxiliary door 52 may be hinged to the door 70 such that the auxiliary door 52 is opened and closed upward and downward.

A locking part (not shown) may be formed at the other side of the auxiliary door 52.

The locking part of the auxiliary door 52 may be detachably inserted into a fixing hole (not shown) formed through the door 70. That is, when the locking part of the auxiliary door 52 is inserted into the fixing hole of the door 70, the auxiliary door 52 remains in a closed state, and when the locking part of the auxiliary door 52 is separated from the fixing hole of the door 70, the auxiliary door 52 remains in an opened state.

One side of the auxiliary door 52 hinged to the door 70 may be a side opposite to the other side of the auxiliary door 52 at which the locking part is formed. That is, when the left side of the auxiliary door 52 is hinged to the door 70, the locking part may be formed at the right side of the auxiliary door 52. When the right side of the auxiliary door 52 is hinged to the door 70, the locking part may be formed at the left side of the auxiliary door 52. When the upper side of the auxiliary door 52 is hinged to the door 70, the locking part may be formed at the lower side of the auxiliary door 52. When the lower side of the auxiliary door 52 is hinged to the door 70, the locking part may be formed at the upper side of the auxiliary door 52.

The auxiliary door 52 remains in a locked state during a washing process, and when the locked state of the auxiliary door 52 is released, the drum 30 stops rotating.

Whether or not the auxiliary door 52 is in a locked state, that is, whether or not the auxiliary door 52 is able to be opened and closed may be determined by a sensor (not shown). For example, it is determined whether the auxiliary door 52 is able to be opened and closed, by use of an optical sensor (not shown). The optical sensor may include a light emitting part (not shown) that emits light in a direction depending on the movement of the auxiliary door 52 and a light receiving part (not shown) that receives light radiated from the light emitting part and outputs a signal having a magnitude corresponding to the amount of light received. A control part (not shown) determines whether the auxiliary door 52 is able to be opened and closed, by analyzing the signal output from the light receiving part, and according to a result of the determination, controls the operation of the drum 30.

The method of determining whether or not the auxiliary door 52 is able to open and close is not limited thereto, and may be variously implemented.

The door 70 is provided at the inside thereof with an auxiliary inlet port 54 and a connection part 53.

The auxiliary inlet port 54 is opened and closed by the auxiliary door 52. The connection part 53 connects the auxiliary inlet port 54 to the drum 30.

The door 70 includes a front housing 71 and a rear housing 72.

The front housing 71 is provided with the auxiliary door 52.

The rear housing 72 is coupled to the front housing 71 to form the connection part 53 in the door 70 and is provided at a rear side thereof with an opening part 55 communicating with the drum 30.

The opening part 55 may be formed at one end portion of the connection part 53, which faces the rear side, and the auxiliary inlet port 54 may be formed at the other end portion of the connection part 53, which faces the front side.

The connection part 53 may be inclined downward as it extends to the inside of the door 70. That is, the connection part 53 may be inclined downward as it extends further toward the opening part 55. Accordingly, the auxiliary inlet port 54 may be formed at a position higher than a position of the opening part 55. Through such a configuration, laundry or detergent put through the auxiliary inlet port 54 may be slid in the gravity direction along the connection part 53, and thus effectively transferred to the drum 30.

The rear housing 72 may protrude toward the rear side of the door 70.

The degree of the rear housing 72 being protruded to the rear side of the door 70 may be decreased upward. Accordingly, laundry put through the auxiliary inlet port 54 is prevented from being damaged by being caught by the diaphragm 90 connecting the cabinet 10 to the tub 20.

A diaphragm (not shown) may be installed on at least one of the auxiliary door 52 and the auxiliary inlet port 54 to prevent water leakage.

The diaphragm may include an injection molded product formed of thermoplastic elastomer. Since the thermoplastic elastomer has elasticity at room temperature, as with rubber, the diaphragm formed of thermoplastic elastomer may effectively prevent water leakage.

At least one of the door 70 and the auxiliary door 52 may include a transparent material allowing a user to observe the washing process with the naked eye. According to an embodiment of the present disclosure, the door 70 and the auxiliary door 52 may include reinforced glass.

Figure 5:
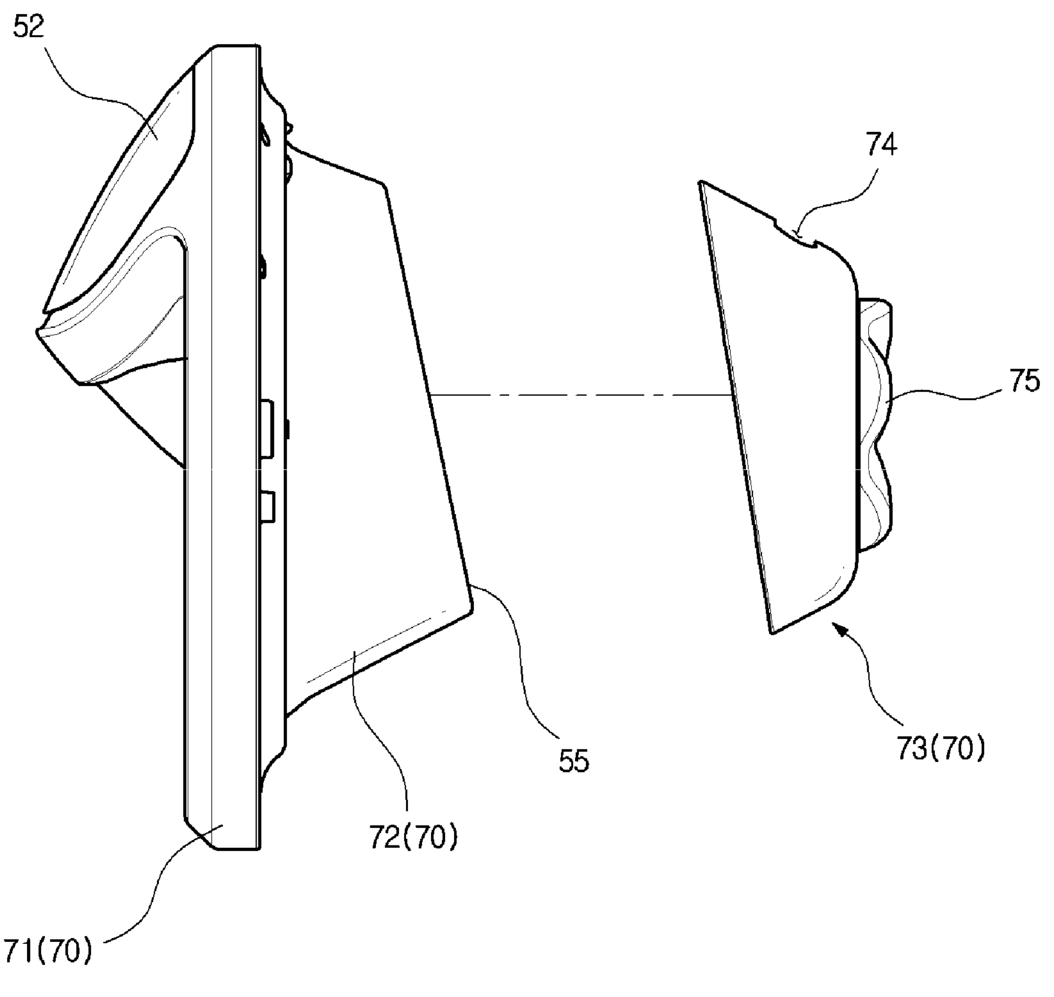
FIG. 5 is a view illustrating a state in which the door of the washing machine is coupled to a cover mounted at a rear of the door in accordance with the first embodiment of the present disclosure.
Figure 6:
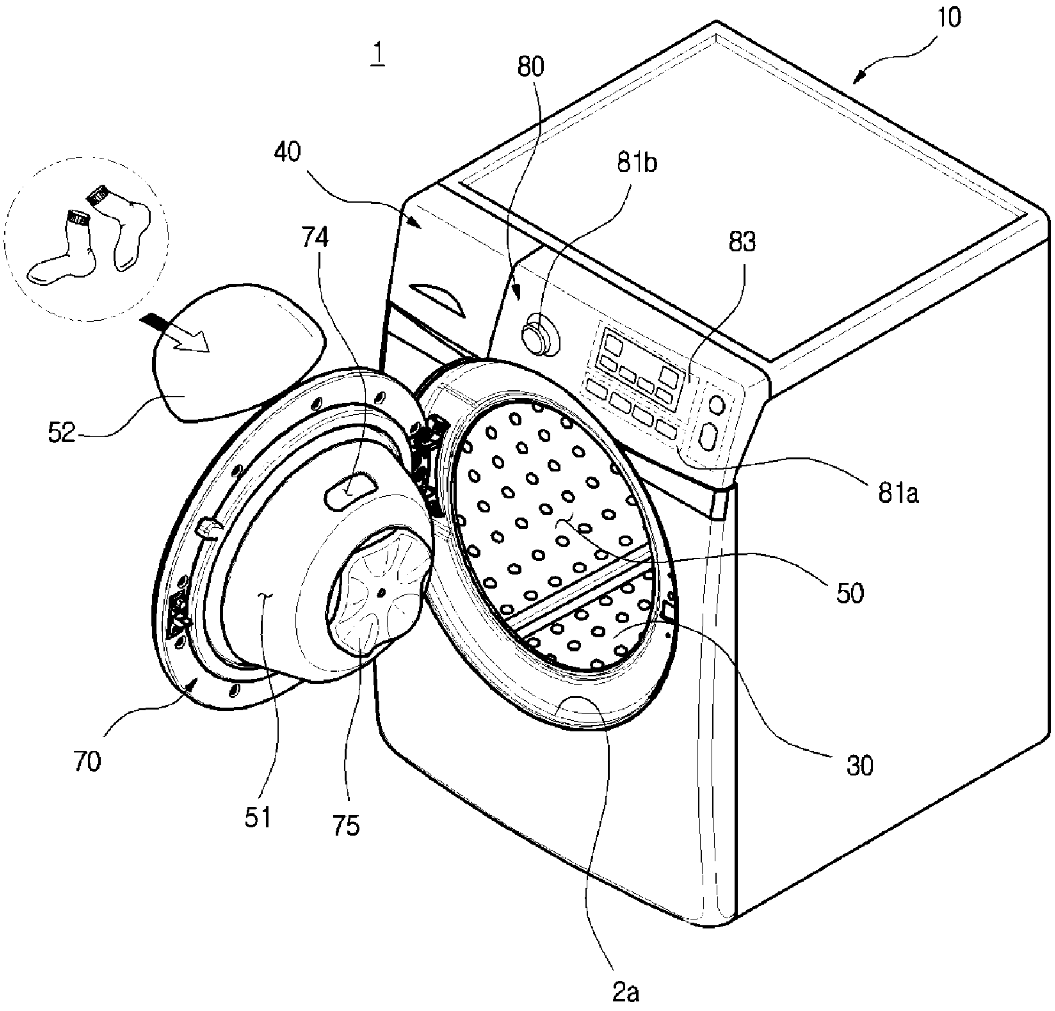
FIG. 6 is a view illustrating a state in which laundry is put into an auxiliary washing space of the washing machine in accordance with the first embodiment of the present disclosure.

FIG. 5 is a view illustrating a state in which the door of the washing machine is coupled to a cover mounted at a rear of the door in accordance with an embodiment of the present disclosure, and FIG. 6 is a view illustrating a state in which laundry is put into an auxiliary washing space of the washing machine in accordance with an embodiment of the present disclosure. In the following description, elements identical to those described above are designated by the same reference numerals shown in FIGS. 1 to 4, and the detailed description thereof will be omitted. The auxiliary washing space 51 may include the connection part 53 described in FIGS. 1 to 4.

Referring to FIGS. 5 and 6, the washing machine 1 may include the main washing space 50 and the auxiliary washing space 51.

A washing process in the main washing space 50 may be performed independent of a washing process in the auxiliary washing space 51. That is, the auxiliary washing space 51 may be divided from the main washing space 50.

The main washing space 50 may be formed in the drum 30.

The auxiliary washing space 51 may be formed in the door 70.

The door 70 may include the front housing 71 and the rear housing 72.

The front housing 71 may be provided with the auxiliary door 52 to open and close the auxiliary washing space 51.

The rear housing 72 is coupled to the front housing 71 to form the auxiliary washing space 51 and is provided at a rear side thereof with the opening part communicating with the drum 30.

The door 70 may further include a cover 73.

In detail, the cover 73 is detachably coupled to the opening part 55.

The front housing 71, the rear housing 72 and the cover 73 are coupled to each other to form the auxiliary washing space 51 that is divided from the main washing space 50.

The cover 73 may include a transparent material.

A pulsator 75 may be installed at the cover 73 to form a flow of wash water stored in the auxiliary washing space 51. The pulsator 75 may be rotatable by a flow of wash water generated in the main washing space 50. Accordingly, the pulsator may be rotated in the same direction as that of the drum 30.

A diaphragm (not shown) may be installed on at least one of the opening part 55 and the cover 73 to prevent water leakage.

The cover 73 may be provided with a wash water inlet hole 74.

The auxiliary washing space 51 may have wash water to be sprayed therein independent of spraying wash water into the main washing space 50. In detail, wash water may be sprayed into the auxiliary washing space 51 through the wash water inlet hole 74.

Wash water stored in the auxiliary washing space 51 may be drained independent of draining wash water stored in the main washing space 50.

Figure 7:
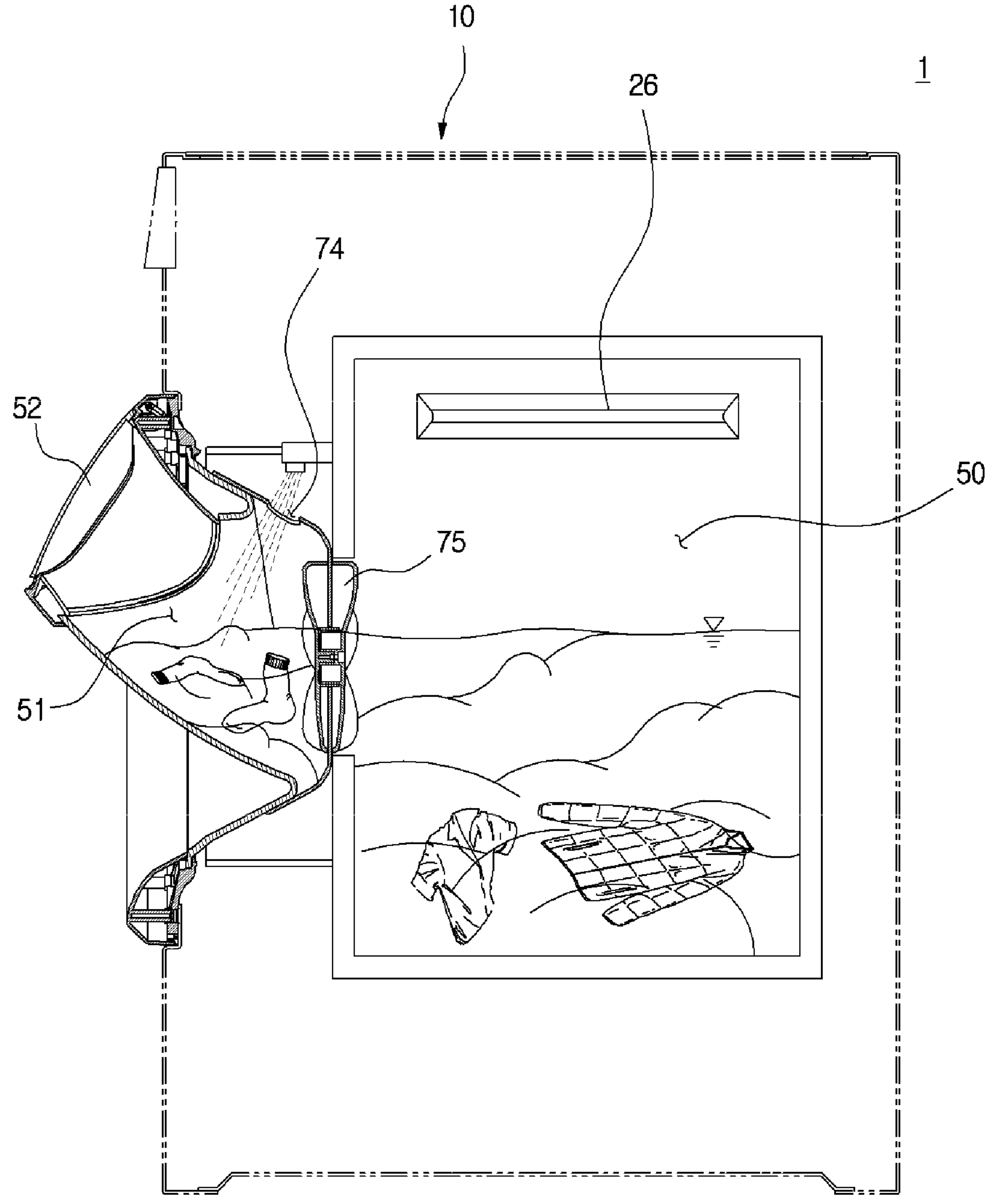
FIG. 7 is a schematic view illustrating a washing cycle of the washing machine in accordance with the first embodiment of the present disclosure.

FIG. 7 is a schematic view illustrating a washing cycle of the washing machine in accordance with an embodiment of the present disclosure. In the following description, elements identical to those described above are designated by the same reference numerals shown in FIGS. 1 to 6.

Referring to FIG. 7, an operation of the washing machine 1 will be described.

When laundry or detergent is put into the main washing space 50 and the auxiliary washing space 51, an appropriate amount of wash water is supplied to the main washing space 50 and the auxiliary washing space 51. As described above, wash water may be supplied to the auxiliary washing space 51 through the wash water inlet hole 74 independent of supplying wash water to the main washing space 50.

As for the main washing space 50, the drum 30 is rotated according to an operation of the driving motor 7, and the lifter 26 lifts the laundry to a predetermined height and then drops the laundry, so that the laundry is washed.

As for the auxiliary washing space 51, the laundry is washed by use of a water current that is generated by the pulsator 75. The washing in the auxiliary washing space 51 may be performed in a gentle manner when compared to the washing in the main washing space 50, and thus suitable for washing laundry that is easily damaged.

After the washing cycle is finished as described above, the wash water in the main washing space 50 and the auxiliary washing space 51 is drained, and a spin dry operation is intermittently performed. Thereafter, the water supply valve 14 is opened, so that wash water is supplied to each of the main washing space 50 and the auxiliary washing space 51 at the same time when a rinsing cycle is performed.

As such, the rinsing cycle and the intermittent spin dry cycle are repeatedly performed, and then a spin dry cycle is performed.

Figure 8:
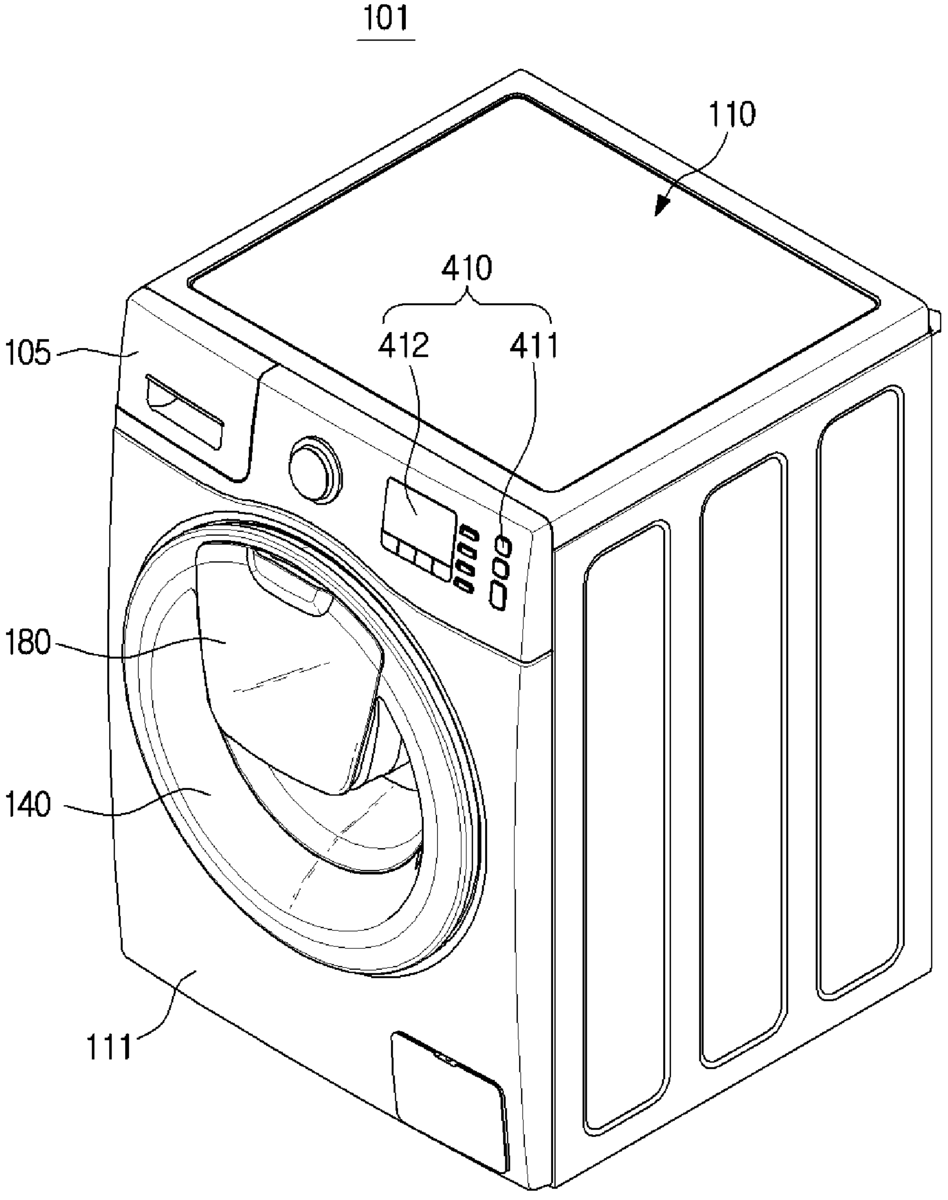
FIG. 8 is a perspective view illustrating the outer appearance of a washing machine according to a second embodiment of the present disclosure.
Figure 9:
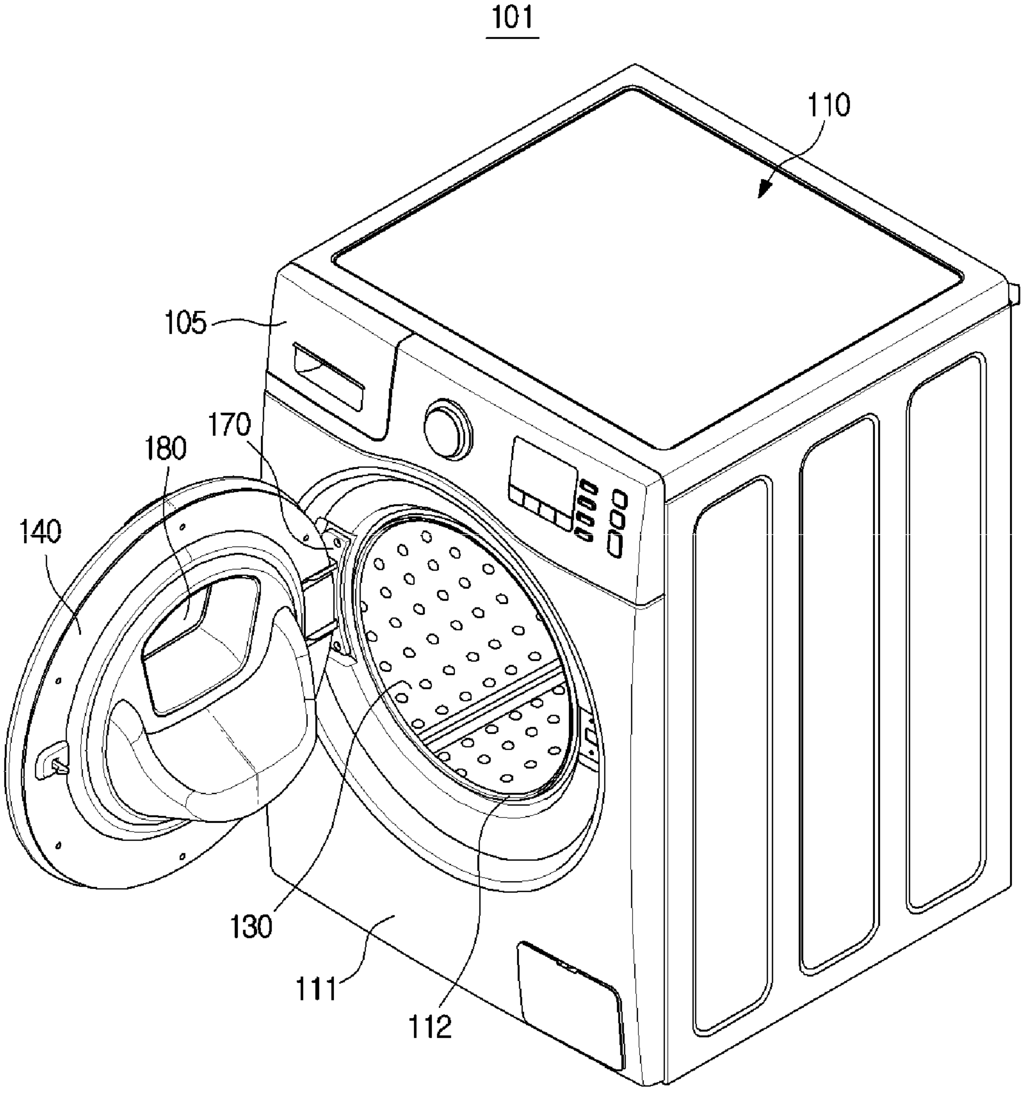
FIG. 9 is a perspective view illustrating a state in which a main door of the washing machine according to the second embodiment of the present disclosure is opened.
Figure 10:
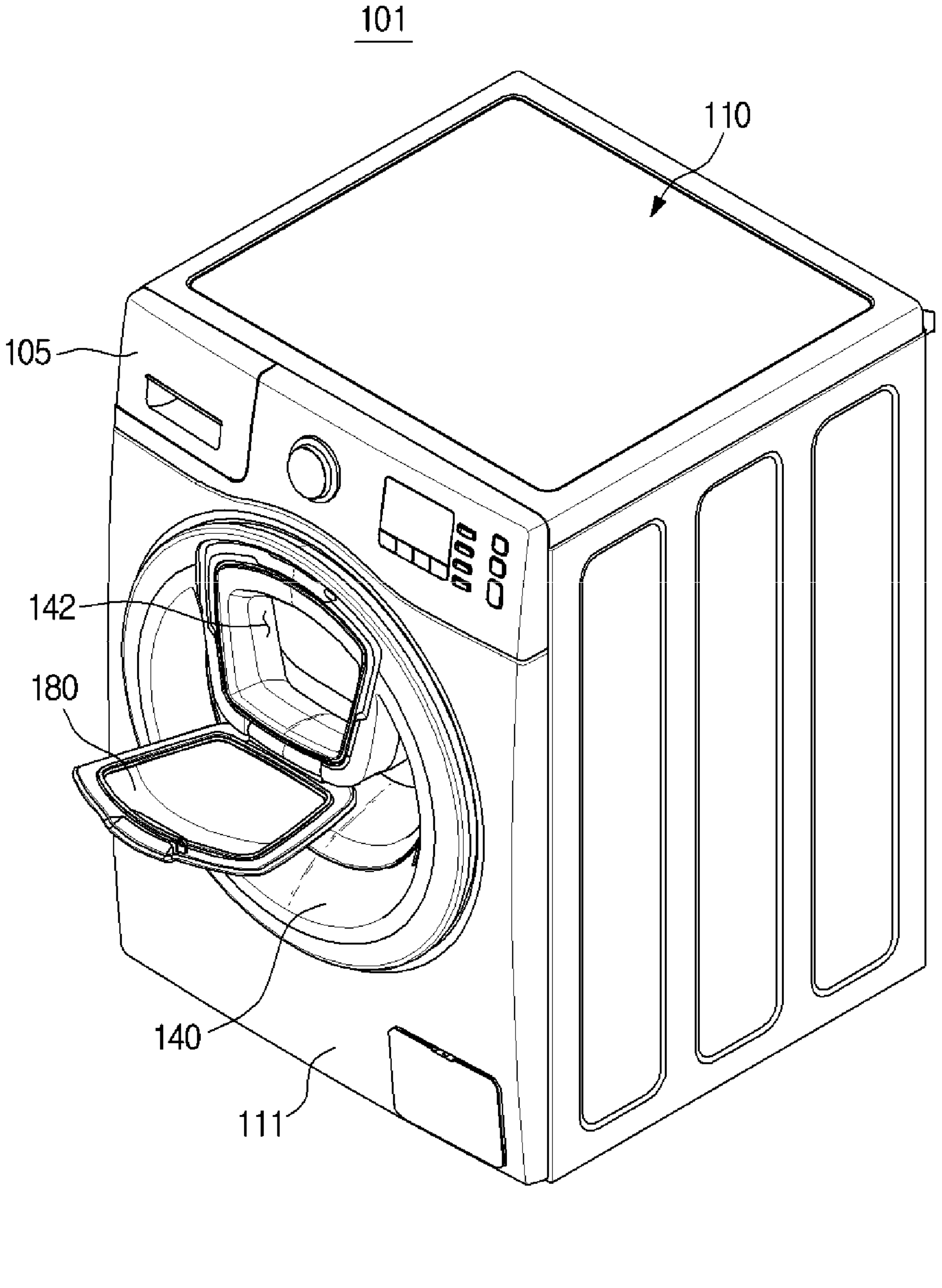
FIG. 10 is a perspective view illustrating a state in which an auxiliary door of the washing machine according to the second embodiment of the present disclosure is opened.
Figure 11:
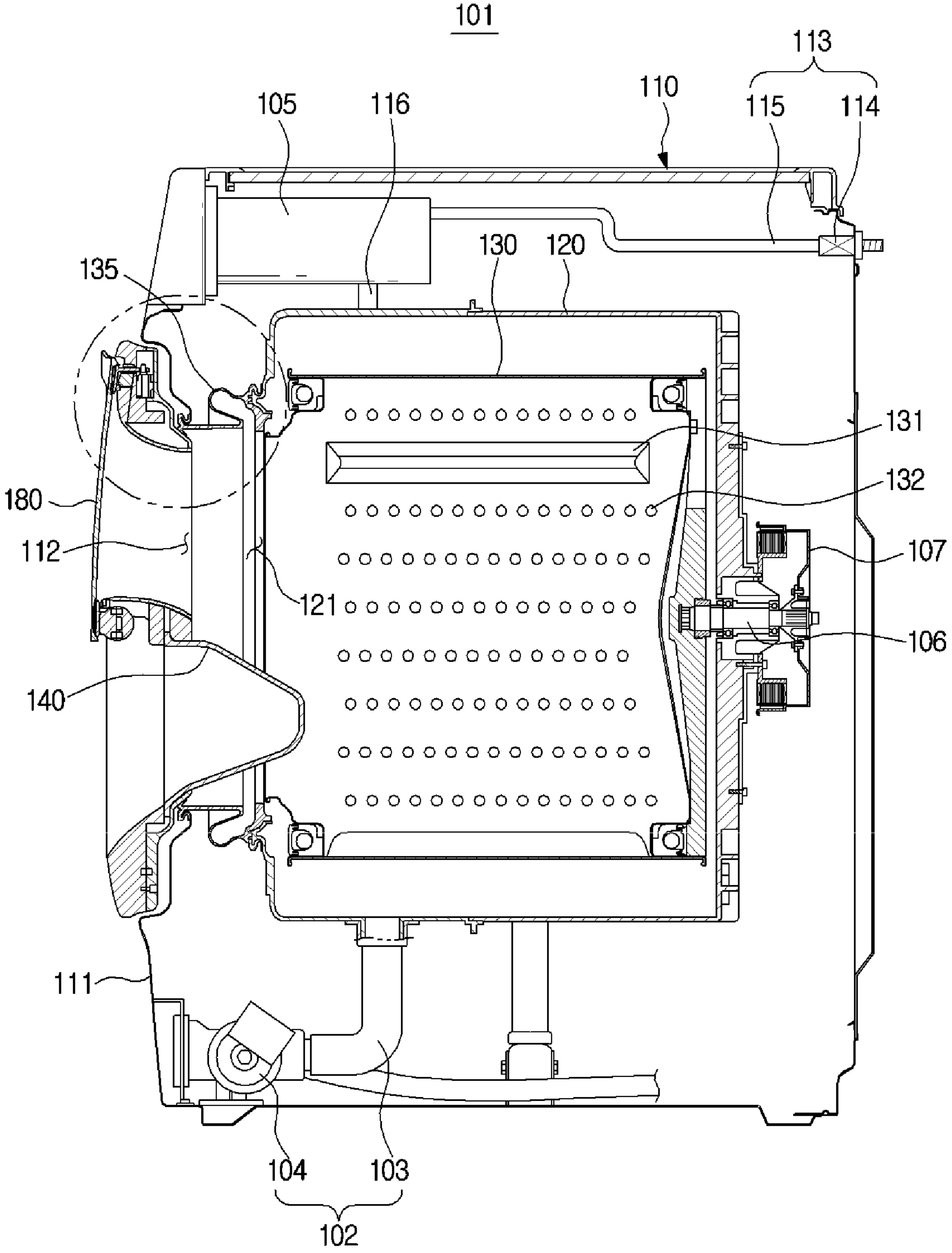
FIG. 11 is a schematic side cross-sectional view of the washing machine according to the second embodiment of the present disclosure.
Figure 12:
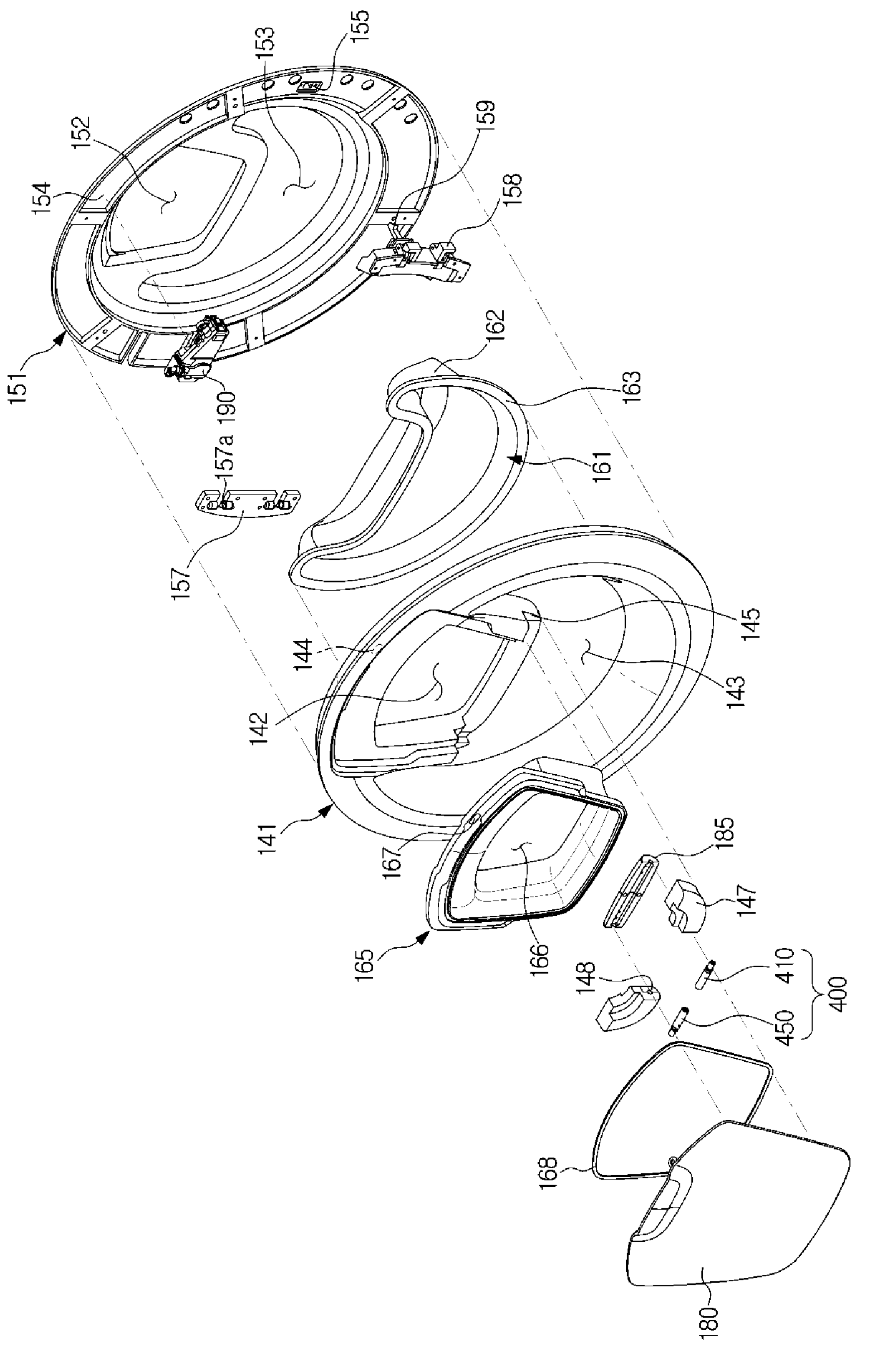
FIG. 12 is an exploded view of a door of the washing machine according to the second embodiment of the present disclosure.
Figure 13:
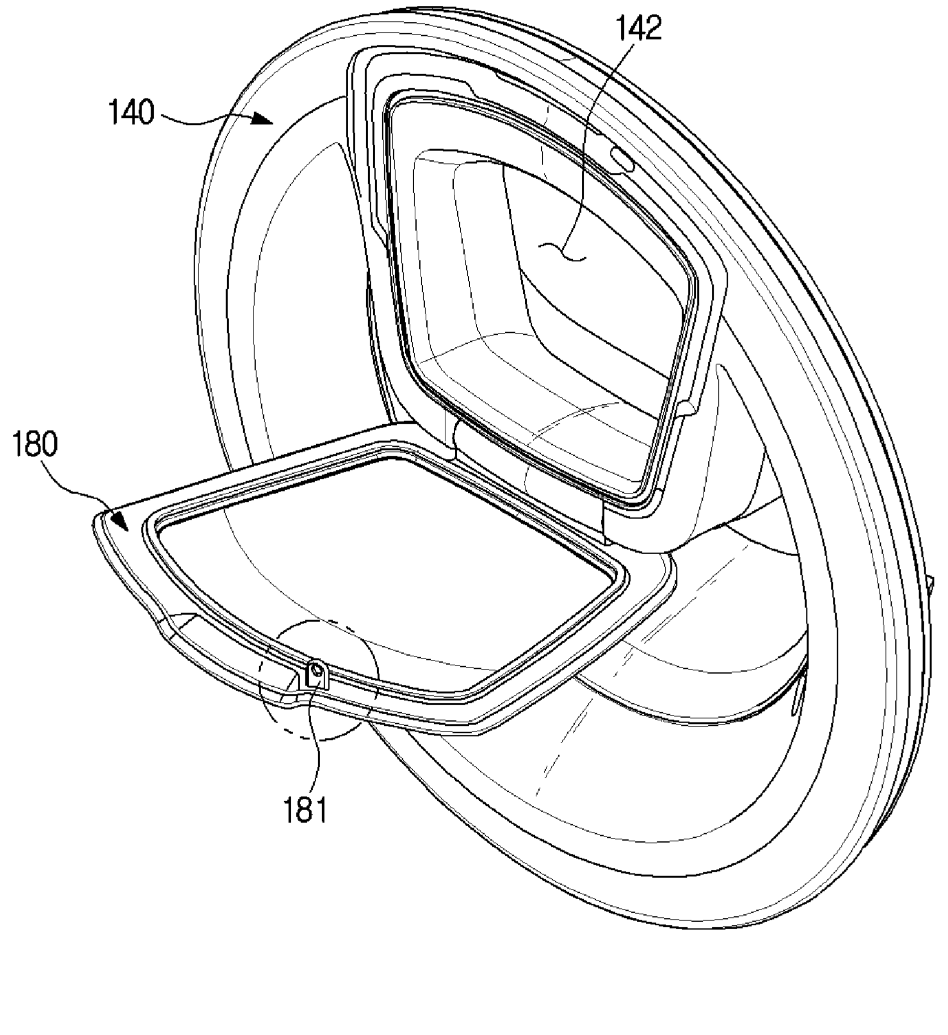
FIG. 13 is a view illustrating the door of the washing machine according to the second embodiment of the present disclosure.
Figure 14:
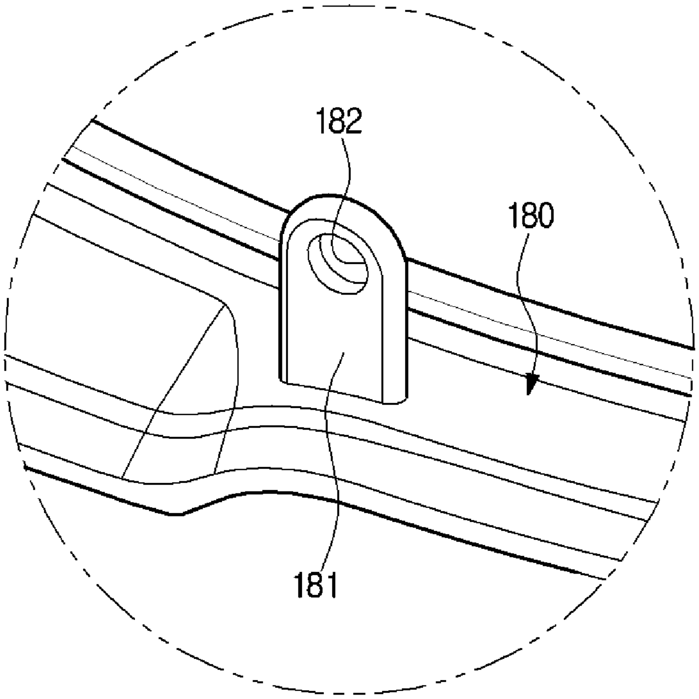
FIG. 14 is an enlarged view of a dotted line portion in FIG. 13.
Figure 15:
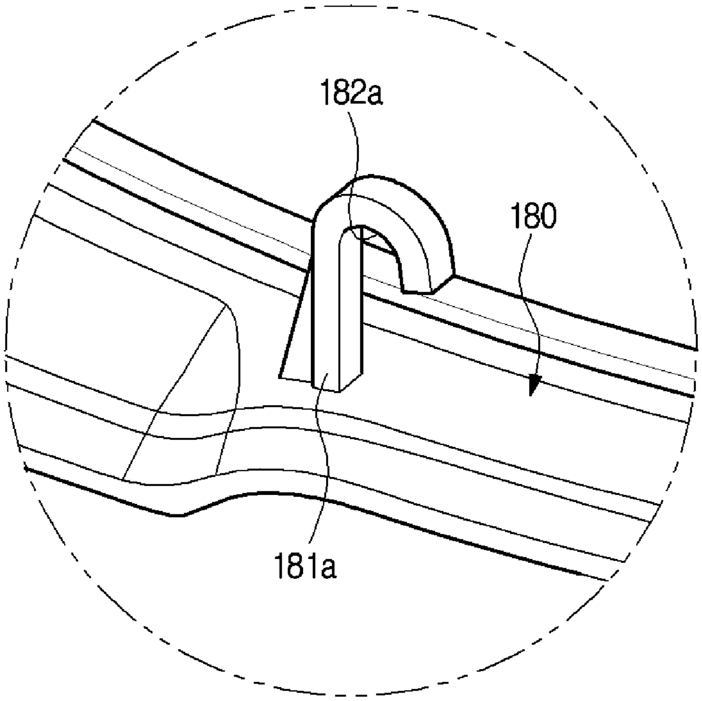
FIG. 15 is a view illustrating a modification of a latch of the washing machine according to the second embodiment of the present disclosure.

FIG. 8 is a perspective view illustrating the outer appearance of a washing machine according to a second embodiment of the present disclosure. FIG. 9 is a perspective view illustrating a state in which a main door of the washing machine according to the second embodiment of the present disclosure is opened. FIG. 10 is a perspective view illustrating a state in which an auxiliary door of the washing machine according to the second embodiment of the present disclosure is opened. FIG. 11 is a schematic side cross-sectional view of the washing machine according to the second embodiment of the present disclosure. FIG. 12 is an exploded view of a door of the washing machine according to the second embodiment of the present disclosure. FIG. 13 is a view illustrating the door of the washing machine according to the second embodiment of the present disclosure. FIG. 14 is an enlarged view of a dotted line portion in FIG. 13. FIG. 15 is a view illustrating a modification of a latch of the washing machine according to the second embodiment of the present disclosure.

The washing machine according to the second embodiment of the present disclosure will be described with reference to FIGS. 8 to 15. A duplicate description of the same configuration as the first embodiment described above will be omitted.

A washing machine 101 includes a cabinet 110 for forming an outer appearance, a tub 120 for receiving wash water to be used for a washing or rinsing cycle, a drum 130 for receiving laundry, and a driving motor 107.

The cabinet 110 may have a substantially box shape. That is, the cabinet 110 may have a cabinet front plate 111, a cabinet rear plate, a cabinet top plate, a cabinet bottom plate, and a cabinet side plate.

The cabinet front plate 111 may be provided with a control panel 410*a* having an input unit 411*a* for receiving an operation command of the washing machine 101 from a user and a display unit 412*a* for displaying operation information of the washing machine 101.

An inlet port 112 is formed in the cabinet front plate 111 to allow laundry to be put into the drum 130. An opening 121 is formed in the tub 120 to allow laundry to be introduced into the drum 130.

A diaphragm 135 (FIG. 11) may be provided between the inlet port 112 of the cabinet front plate 111 and the opening 121 of the tub 120. The diaphragm 135 forms a passage between the inlet port 112 of the cabinet front plate 111 and the opening 121 of the tub 120. The diaphragm 135 reduces transmission of vibration generated during rotation of the drum 130 to the cabinet front plate 111.

A water supply device 113 for supplying wash water to the tub 120 may be provided at an upper portion of the tub 120. The water supply device 113 may comprise a water supply pipe 115 for supplying wash water from an external water supply source and a water supply valve 114 for opening and closing the water supply pipe 115.

A detergent supply device 105 for supplying detergent to the tub 120 may be provided at a front upper portion of the cabinet 110. The detergent supply device 105 may be connected to the tub 120 via a connection pipe 116. The wash water supplied through the water supply pipe 115 may be supplied to the inside of the tub 120 together with the detergent via the detergent supply device 105.

A driving motor 107 for generating a rotational force for rotating the drum 130 may be provided on the rear surface of the tub 120. The rotational force generated by the driving motor 107 can be transmitted to the drum 130 through the driving shaft 106. The driving shaft 106 passes through the rear wall of the tub 120 and connects the drum 130 and the driving motor 107.

A drainage device 102 for discharging the wash water in the tub 120 to the outside of the cabinet 110 may be provided at a lower portion of the tub 120. The drainage device 102 may include a drain pipe 103 for guiding the wash water of the tub 120 to the outside of the cabinet 110 and a drain pump 104 for pumping the wash water of the tub 120.

The drum 130 performs washing by raising and lowering the laundry while rotating inside the tub 120. For this purpose, a plurality of through holes 132 for circulating the wash water are formed around the drum 130. A plurality of lifters 131 may be provided on the inner circumferential surface of the drum 130 to raise the laundry when the drum 130 rotates.

The inlet port 112 may be opened and closed by doors 140 and 180 that are rotatably coupled to the cabinet front plate 111. The doors 140 and 180 include the main door 140 and the auxiliary door 180 coupled to the main door 140 to allow laundry to be added without opening the main door 140 during a washing cycle of the washing machine 101.

The main door 140 and the auxiliary door 180 can be opened and closed independently of each other. That is, only the main door 140 may be opened as shown in FIG. 9, or only the auxiliary door 180 may be opened as shown in FIG. 10.

The main door 140 is rotatable in the left-right direction, and the auxiliary door 180 is rotatable in the up-and-down direction. That is, the rotation axis of the main door 140 and the rotation axis of the auxiliary door 180 may be orthogonal to each other.

Alternatively, the main door 140 and the auxiliary door 180 may be rotated in the same direction. That is, the rotation axis of the main door 140 and the rotation axis of the auxiliary door 180 may be parallel to each other. Further, the rotation axis of the main door 140 and the rotation axis of the auxiliary door 180 may be provided on the same line.

The auxiliary door 180 is provided approximately at the upper portion of the main door 140. That is, the auxiliary door 180 should be provided at a position higher than the water level of the wash water stored in the tub 120 during the washing cycle.

Hereinafter, the configurations of the main door 140 and the auxiliary door 180 will be described in detail.

As shown in FIG. 12, the main door 140 includes a door cover 141 having an auxiliary inlet port 142, a door holder 151 provided at the rear of the door cover 141 having a rear opening 152 corresponding to the auxiliary inlet port 142, and a glass member 161 which is coupled between the door cover 141 and the door holder 151.

The door cover 141 forms the front exterior of the main door 140 and supports the glass member 161 together with the door holder 151. A glass member mounting hole 143 is provided under the auxiliary inlet port 142 of the door cover 141 so that the glass member 161 is disposed. The door cover 141 may have a substantially circular shape having the auxiliary inlet port 142 and the glass member mounting hole 143.

The auxiliary door 180 may be coupled to the door cover 141. The door cover 141 is provided with a hinge unit holder coupling portion 145 and the hinge unit holder coupling portion 145 can be coupled with a hinge unit holder 147. The hinge unit holder 147 can support a hinge unit 400 that rotatably supports the auxiliary door 180. The hinge unit holder 147 may be formed with an insertion hole 148 into which the hinge unit 400 is inserted.

A latch passing hole 144 through which a latch 181 (FIG. 13) of the auxiliary door 180 passes is formed at the upper end of the door cover 141. The latch 181 of the auxiliary door 180 can approach an auxiliary door locking device 190, to be described later, through the latch passing hole 144 of the door cover 141 in a state where the auxiliary door 180 is closed.

The door holder 151 forms the rear outer appearance of the main door 140 and supports the glass member 161 together with the door cover 141. A glass member mounting hole 153 is provided below the rear opening 152 of the door holder 151 so that the glass member 161 is disposed. The door holder 151 may have a substantially circular shape having the rear opening 152 and the glass member mounting hole 153.

The hinge coupling member 157 may be coupled to the door holder 151. A hinge member 170 (FIG. 9) for rotatably supporting the main door 140 may be coupled to the hinge coupling member 157.

The main door locking device 158 may be coupled to the door holder 151. The main door locking device 158 can keep the main door 140 in a closed state. The main door locking device 158 includes a locking hook 159 which is provided to be engaged with a locking switch (not shown) provided in the cabinet 110.

When the user pushes the main door 140 with a predetermined force in a state where the main door 140 is closed, the locking hook 159 is released and the main door 140 can be opened. This is to prevent an accident such that an infant or the like cannot escape from being trapped inside the cabinet 110 by oneself.

That is, when the main door locking device locks the main door 140, the main door 140 cannot be opened by a normal human force, and the lock is released through the main door locking device to open the main door 140.

When the main door 140 is opened during the washing cycle of the washing machine 101, there is a danger that the wash water of high temperature is discharged to the outside. The main door locking device can be implemented in various ways.

The door holder 151 is formed with a through hole 155 through which the hook 159 of the main door locking device 158 passes.

The door holder 151 may be equipped with the auxiliary door locking device 190 for locking the auxiliary door 180.

The auxiliary door locking device 190 may be mounted on a front surface 154 of the door holder 151. That is, the auxiliary door locking device 190 may be disposed between the door cover 141 and the door holder 151.

The auxiliary door locking device 190 locks the auxiliary door 180. Locking of the auxiliary door 180 is also required for the same reason as that of the main door 140. In particular, since the auxiliary door 180 is small in size and light in weight compared to the main door 140, it can be easily opened by the pressure inside the cabinet 110. Therefore, auxiliary door locking is essential to prevent the unintentional opening of the auxiliary door 180 during the washing cycle. The detailed configuration of the auxiliary door locking device 190 will be described later.

The glass member 161 can be supported by the door cover 141 and the door holder 151. The glass member 161 may be formed of a glass material or other transparent plastic material. The user can view the inside of the cabinet 110 through the glass member 161 even when the main door 140 is closed.

The glass member 161 may have a flange portion 163 formed on the rim for engagement with the door cover 141 and the door holder 151, and a convex portion 162 protruding rearward.

The convex portion 162 prevents the laundry in the drum 130 from being biased toward the main door 140. The convex portion 162 prevents the laundry from colliding with the main door 140 and damaging the laundry. The convex portion 162 prevents the laundry from pressing the diaphragm 135.

The main door 140 may further include a chute 165 for guiding the laundry introduced into the auxiliary inlet port 142 into the drum 130.

The chute 165 may have a passage 166 extending rearward from the auxiliary inlet port 142 of the door cover 141. The passage 166 may be provided so as to extend from the auxiliary inlet port 142 of the door cover 141 to the rear opening 152 of the door holder 151. The front end of the chute 165 is provided on the front surface of the door cover 141.

The chute 165 may be provided as a separate component from the door cover 141 and the door holder 151 and may be coupled to the door cover 141 and the door holder 151 as in the present embodiment, or unlike the chute 165 may be formed integrally with the door cover 141 or the door holder 151.

A latch passing hole 167 through which the latch 181 of the auxiliary door 180 passes may be formed at the upper end of the chute 165 so as to correspond to the latch passing hole 144 of the door cover 141. However, unlike the present embodiment, the chute 165 is provided to deviate from the path of the latch 181, and therefore, the chute 165 may not be provided with the latch passing hole 167.

Between the auxiliary door 180 and the chute 165, a sealing member 168 for sealing may be provided.

The auxiliary door 180 is rotatably coupled to the door cover 141 to open and close the auxiliary inlet port 142 of the door cover 141.

The auxiliary door 180 may be rotatably supported by hinge units 400, 410, and 450. The auxiliary door 180 may include a hinge unit cover 185 for receiving the hinge units 400, 410, and 450. Details of the hinge units 400, 410, and 450 will be described later.

The auxiliary door 180 may be formed of a transparent material so that the inside of the auxiliary inlet port 142 can be seen.

As shown in FIGS. 13 and 14, the auxiliary door 180 has the latch 181 for locking. The latch 181 may protrude from the upper end of the auxiliary door 180 toward the rear of the auxiliary door 180.

A locking hole 182 is formed in the latch 181. A locking bar 195 of the auxiliary door locking device 190 may be inserted into the locking hole 182, which will be described later, to lock the auxiliary door 180.

In this embodiment, the locking hole 182 has a circular hole shape, but the shape of the locking hole 182 is not limited to this.

In this embodiment, the latch 181 has a simple rod shape and the locking hole 182 has a closed opening shape. Alternatively, a latch 181*a* (FIG. 15) has a hook shape and a lock hole 182*a* may have an open aperture shape.

Figure 16:
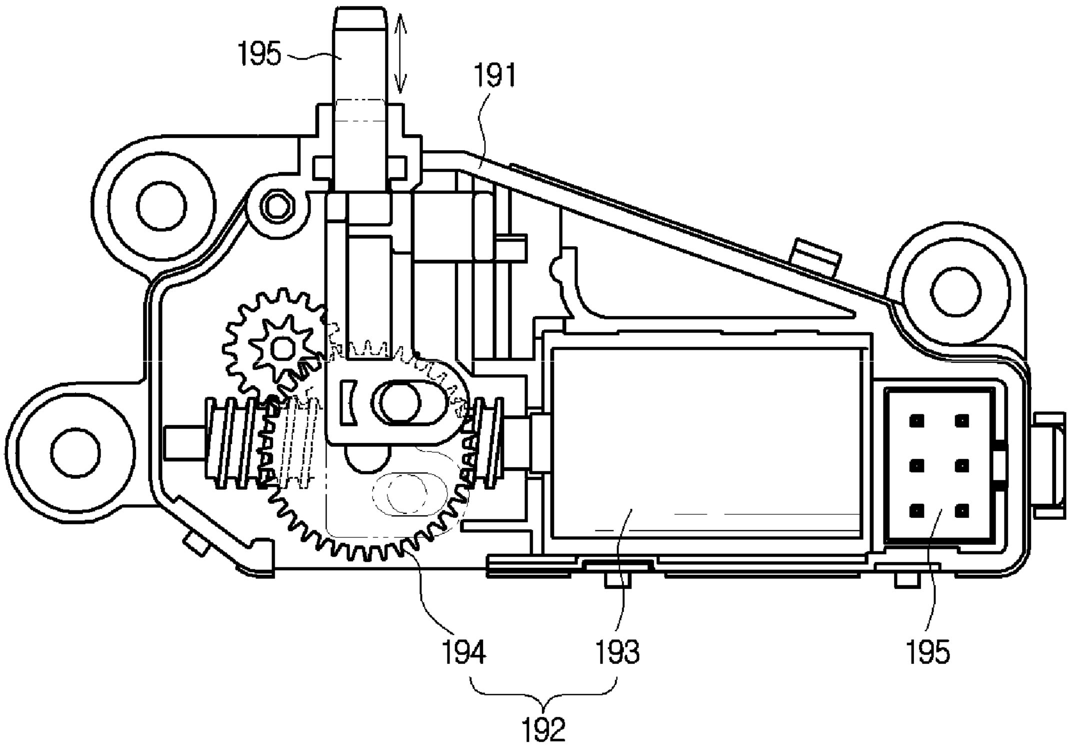
FIG. 16 is a sectional view illustrating a configuration of a locking device of the washing machine according to the second embodiment of the present disclosure.
Figure 17:
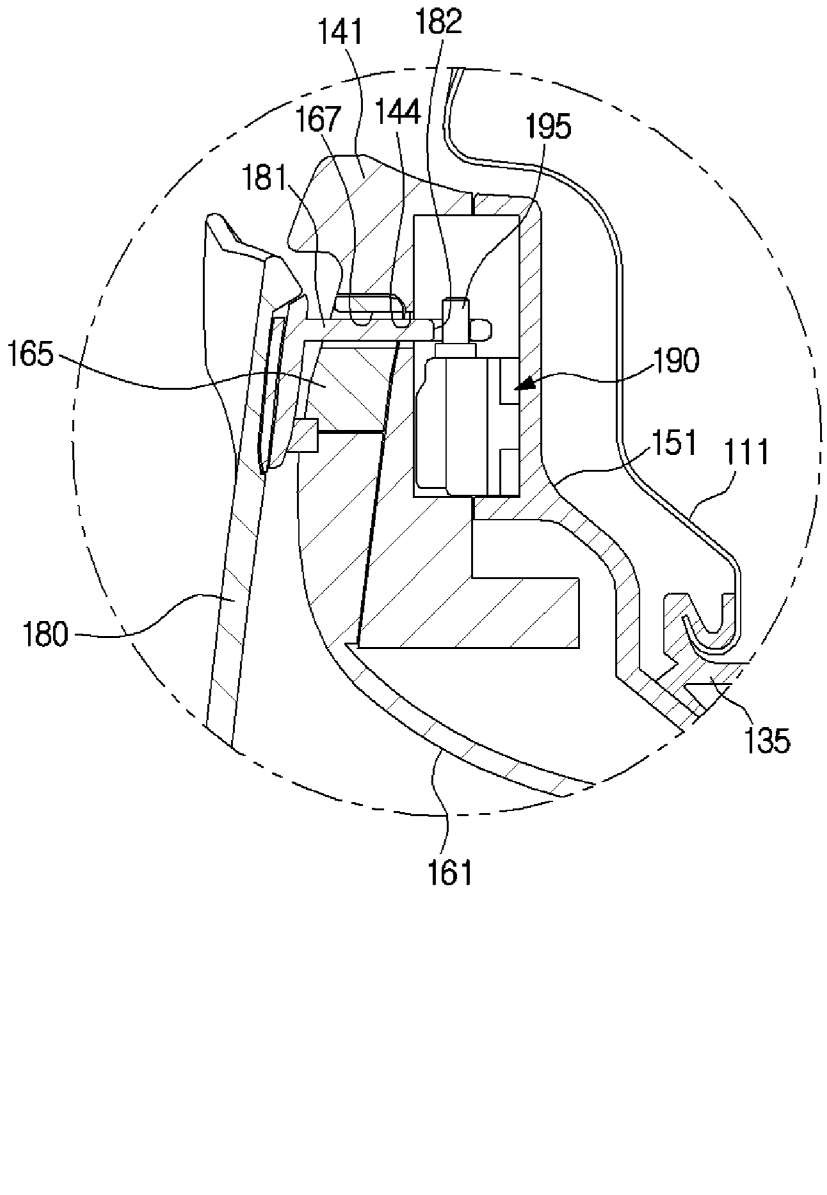
FIG. 17 is a cross-sectional view illustrating a locking structure of the auxiliary door of the washing machine according to the second embodiment of the present disclosure, and is an enlarged view of a dotted line portion in FIG. 11.
Figure 18:
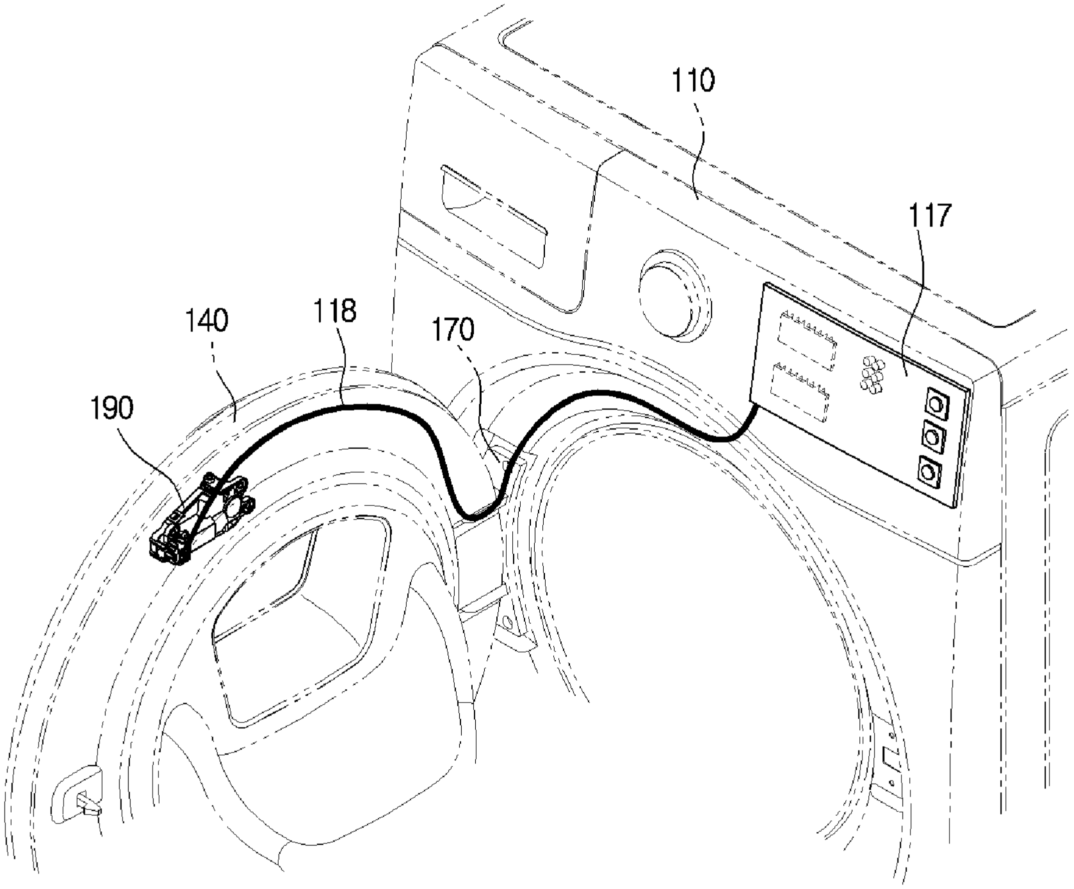
FIG. 18 is a view illustrating a connection structure between a power source and the locking device of the washing machine according to the second embodiment of the present disclosure.
Figure 19:
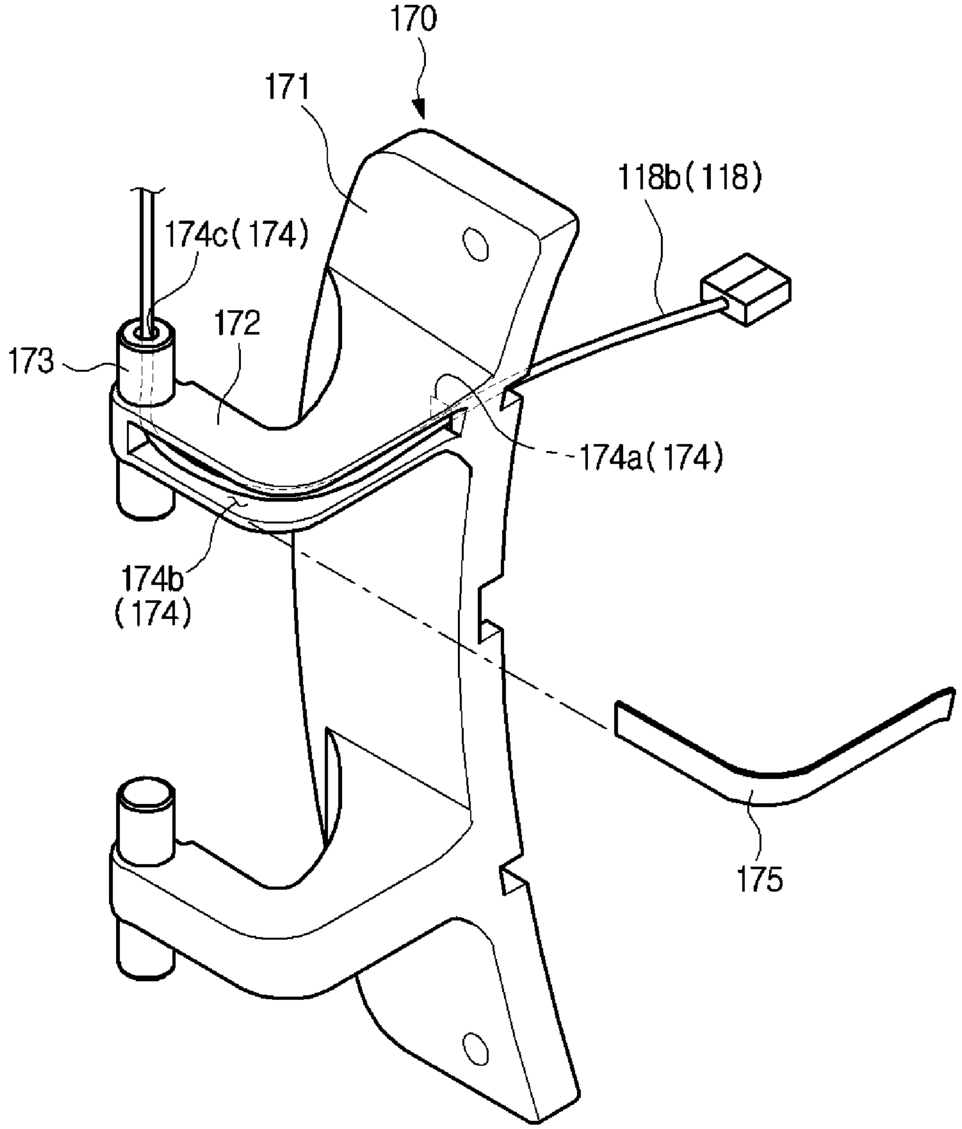
FIG. 19 is a view illustrating a structure in which electric wires of the washing machine according to the second embodiment of the present disclosure pass through a hinge member.

FIG. 16 is a sectional view illustrating a configuration of a locking device of the washing machine according to the second embodiment of the present disclosure. FIG. 17 is a cross-sectional view illustrating a locking structure of the auxiliary door of the washing machine according to the second embodiment of the present disclosure, and is an enlarged view of a dotted line portion in FIG. 11. FIG. 18 is a view illustrating a connection structure between a power source and the locking device of the washing machine according to the second embodiment of the present disclosure. FIG. 19 is a view illustrating a structure in which electric wires of the washing machine according to the second embodiment of the present disclosure pass through a hinge member. FIGS. and 21 are views illustrating a state in which a connector is housed in a rear surface of the hinge member of the washing machine according to the second embodiment of the present disclosure.

Referring to FIGS. 16 to 21, the auxiliary door locking device for the washing machine according to the second embodiment of the present invention will be described. Hereinafter, simply the locking device may mean the auxiliary door locking device.

The locking device 190 includes a housing 191, the locking bar 195 which can be advanced and retracted to be inserted into the locking hole 182 of the latch 181, a driving unit 192 provided inside the housing 191 to drive the locking bar 195, and a power terminal 196 for supplying power to the driving unit 192.

The driving unit 192 may include a motor 193 that generates a rotational force when electric power is applied and a gear assembly 194 that converts the rotational force generated by the motor 193 into a linear motion of the locking bar 195.

The gear assembly 194 may include a ball screw, a rack pinion, and various mechanical elements capable of converting rotational motion into linear motion.

In this embodiment, the driving unit 192 uses the motor 193 to drive the locking bar 195, but the present invention is not limited thereto. For example, various types of actuators such as a hydraulic actuator and a bimetallic actuator may be used in addition to the motor 193.

The power terminal 196 receives power from the outside of the locking device 190 and supplies the power to the driving unit 192. The power terminal 196 may be connected to the power source 117 provided in the cabinet 110 through the electric wire 118. The connection structure of the power terminal 196 and the power source 117 will be described later.

As shown in FIG. 17, when the auxiliary door 180 is closed, the latch 181 of the auxiliary door 180 passes through the latch passing hole 144 of the door cover 141 and approaches the locking device 190 disposed between the door cover 141 and the door holder 151.

The locking bar 195 is moved and inserted into the locking hole 182 of the latch 181 when the power is applied to the locking device 190 so that the auxiliary door 180 can be locked.

As shown in FIG. 18, the cabinet 110 of the washing machine 101 may be provided with the power source 117 for supplying electric power to the locking device 190. The power source 117 may generate power by receiving power from a commercial power source outside the washing machine 101. The power source 117 may include a printed circuit board on which various electronic elements such as a voltage-controlled semiconductor element or a current-controlled semiconductor element are mounted.

The locking device 190 may be connected to the power source 117 by an electric wire 118 to receive power from the power source 117.

The electric wire 118 includes various wires for transmitting power. The electric wire 118 may be a conductor made of copper, aluminum, steel, silver, or the like coated with an insulator.

The electric wire 118 may be arranged to pass through the hinge member 170 to connect the electric power source 117 provided in the cabinet 110 and the locking device 190 provided in the main door 140.

Figure 20:
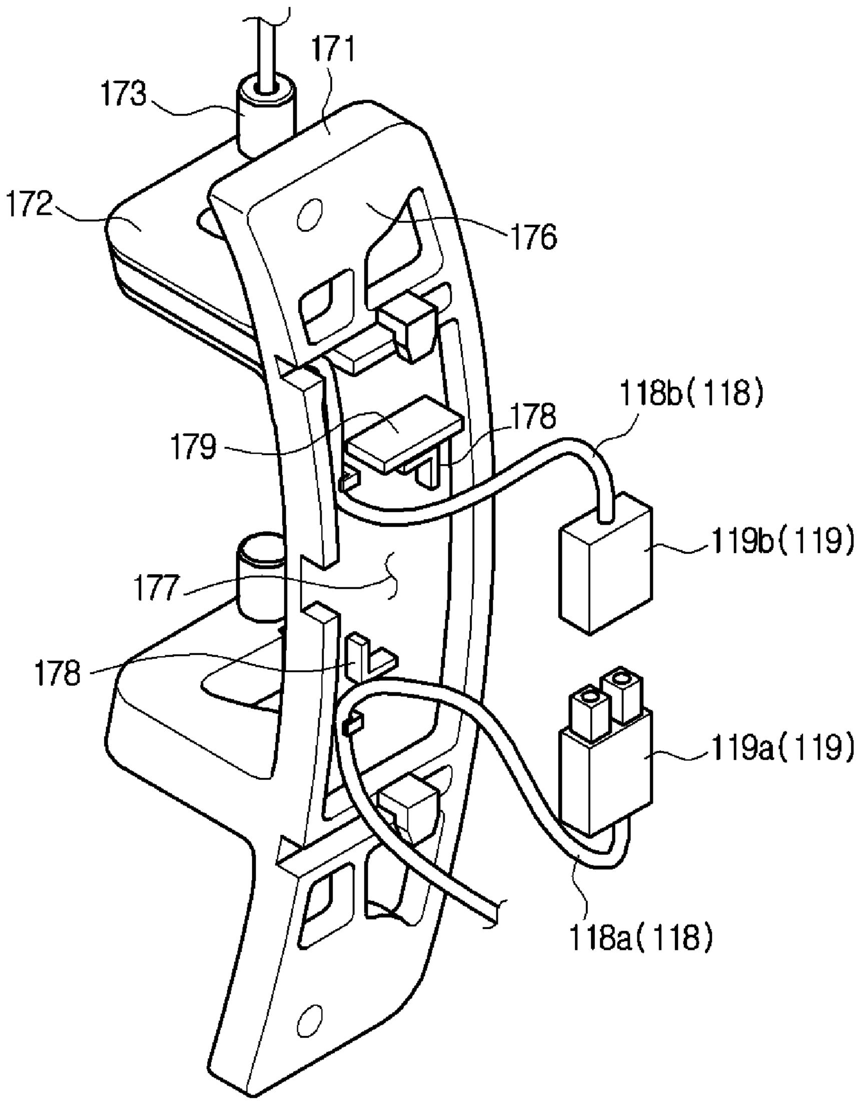
FIGS. 20 and 21 are views illustrating a state in which a connector is housed in a rear surface of the hinge member of the washing machine according to the second embodiment of the present disclosure.
Figure 21:
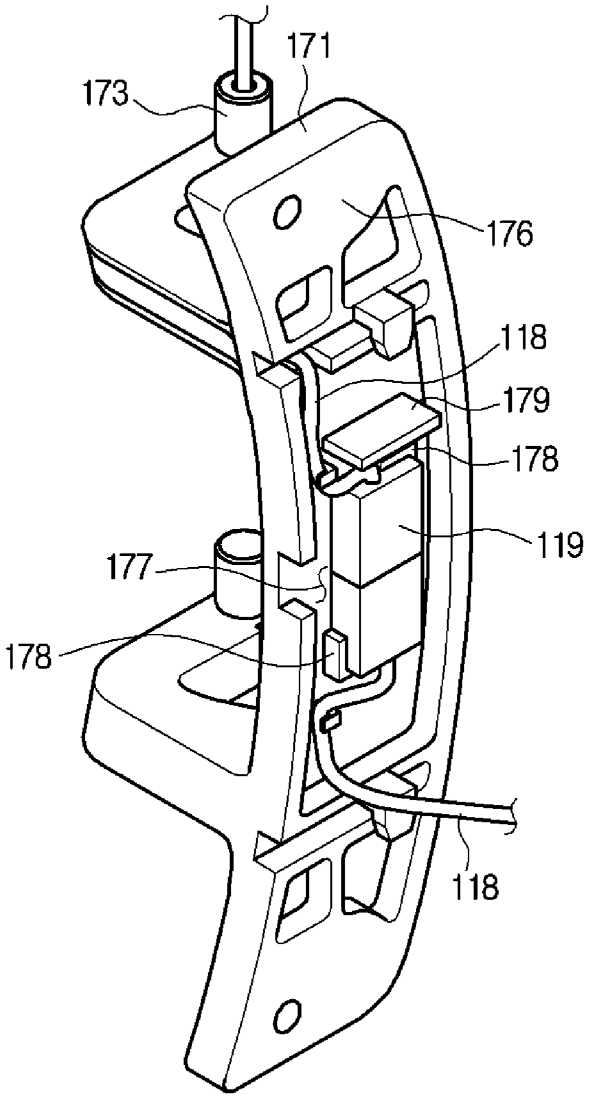

Referring to FIGS. 19 to 21, the hinge member 170 includes a cabinet coupling portion 171 coupled to the cabinet 110, at least one hinge arm 172 protruding from the cabinet coupling portion 171, and a hinge shaft 173 protruding from the hinge arm 172 to support the main door 140 rotatably.

The cabinet coupling portion 171 may be coupled to a hinge coupling portion 111*c* (see FIG. 25) formed on the cabinet front plate 111. The cabinet coupling portion 171 can be firmly coupled to the cabinet front plate 111 through a fastening member such as a screw. The back surface 176 of the cabinet coupling portion 171 can be in close contact with the cabinet front plate 111.

The hinge arm 172 may protrude from the cabinet coupling portion 171 toward the main door 140 side. The hinge arm 172 can be bent in the direction toward the outside from the center of the cabinet 110.

The hinge shaft 173 may protrude from the end of the hinge arm 172 in the vertical direction. The hinge shaft 173 is inserted into the shaft insertion hole 157*a* (FIG. 12) of the main door 140, and supports the main door 140 rotatably.

The hinge member 170 may include a wire passage 174 through which the electric wire 118 passes. The wire passage 174 may be provided inside the hinge member 170 so that the electric wire 118 is not exposed to the outside.

The wire passage 174 includes a first wire passage 174*a* formed to penetrate the inside of the cabinet coupling portion 171, a second wire passage 174*b* formed to open at one side of the hinge arm 172, and a third wire passage 174*c* formed to penetrate the inside of the shaft 173.

The first wire passage 174*a*, the second wire passage 174*b*, and the third wire passage 174*c* may be connected to each other.

A wire cover 175 for sealing the second wire passage 174*b* may be coupled to one open surface of the second wire passage 174*b* provided on the hinge arm 172.

However, it is needless to say that, unlike the present embodiment, the second wire passage 174*b* can be formed to penetrate the inside of the hinge arm 172 without the open surface.

The electric wire 118 has a first electric wire 118*a* having one end connected to the power source 117 and the other end having a first connector 119*a*, and a second electric wire 118*b* having one end of which is connected to the locking device 190 and the other end of which is connected to a second connector 119*b*. The first electric wire 118*a* and the second electric wire 118*b* may be interconnected by connecting the first connector 119*a* and the second connector 119*b*.

A connector receiving groove 177 in which the connector 119 is hermetically sealed may be formed on the back surface 176 of the cabinet coupling portion 171 of the hinge member. The connector receiving groove 177 may be formed with a fixed rib 178 protruding to fix the connector 119.

The cabinet coupling portion 171 of the hinge member may be provided with a moisture permeation prevention rib 179 for preventing water from penetrating into the connector 119. The moisture permeation prevention ribs 179 can be provided on the upper portion of the connector receiving groove 177 to prevent the moisture falling down along the back surface 176 of the cabinet coupling portion 171 of the hinge member from penetrating into the connector 119.

Figure 22:
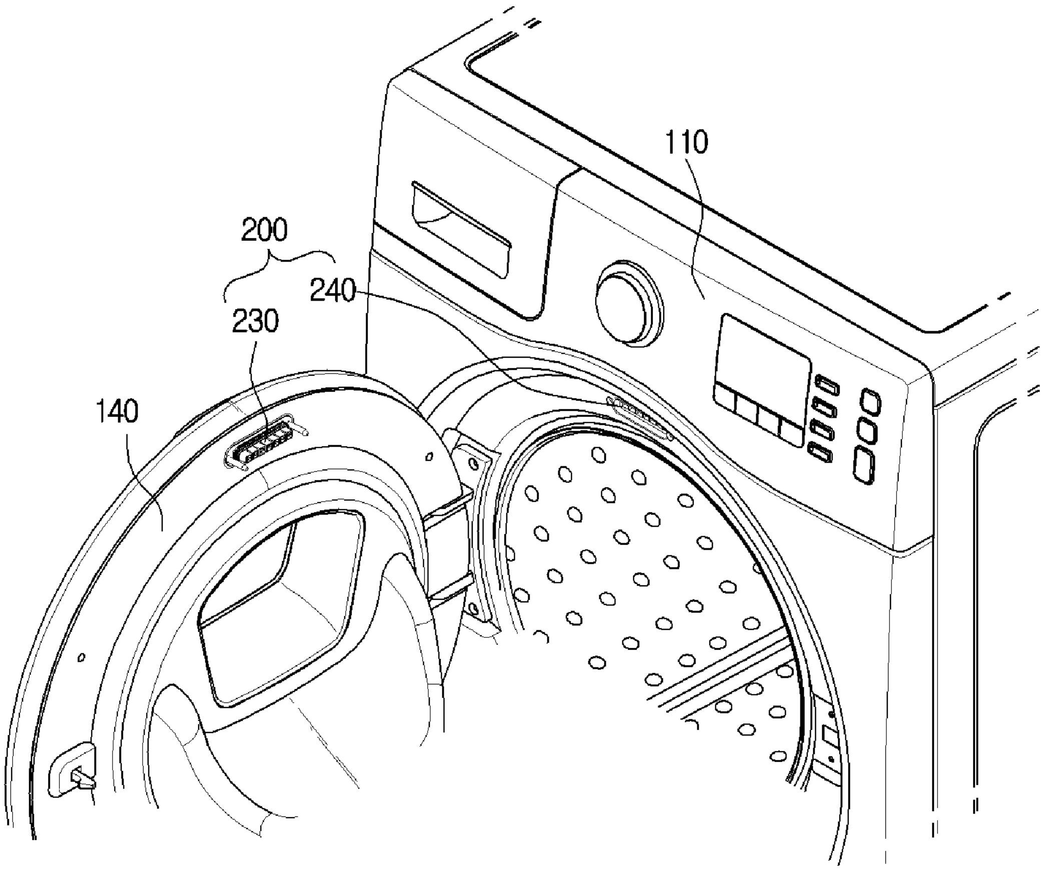
FIG. 22 is a view illustrating a cabinet of a washing machine according to a third embodiment of the present disclosure and a mounting connector mounted on a main door.
Figure 23:
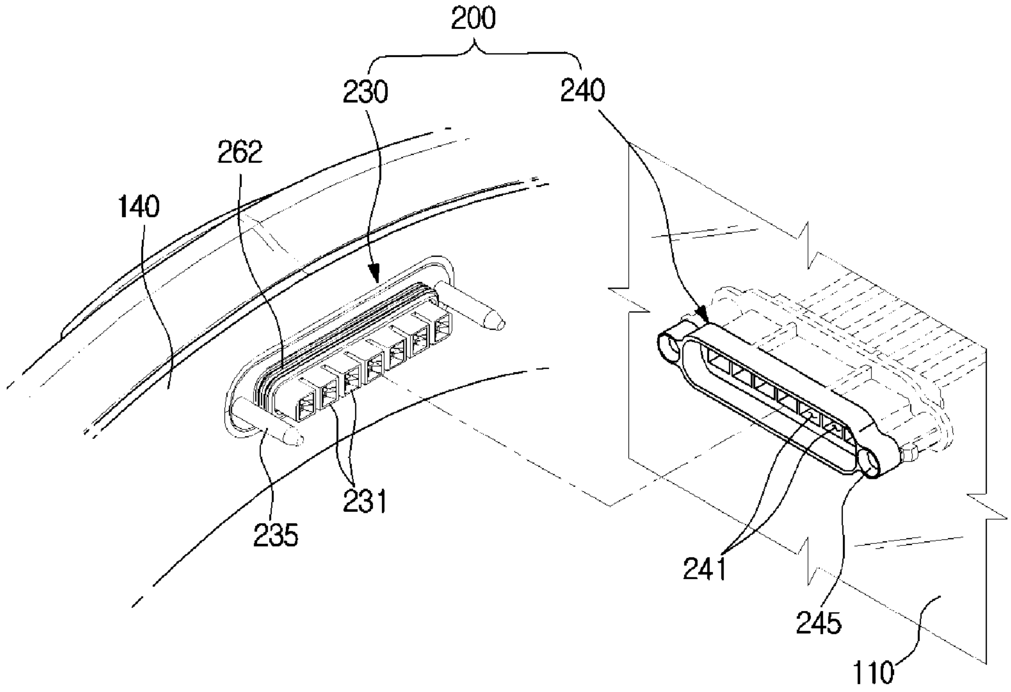
FIG. 23 is a view illustrating the mounting connector of the washing machine according to the third embodiment of the present disclosure.
Figure 24:
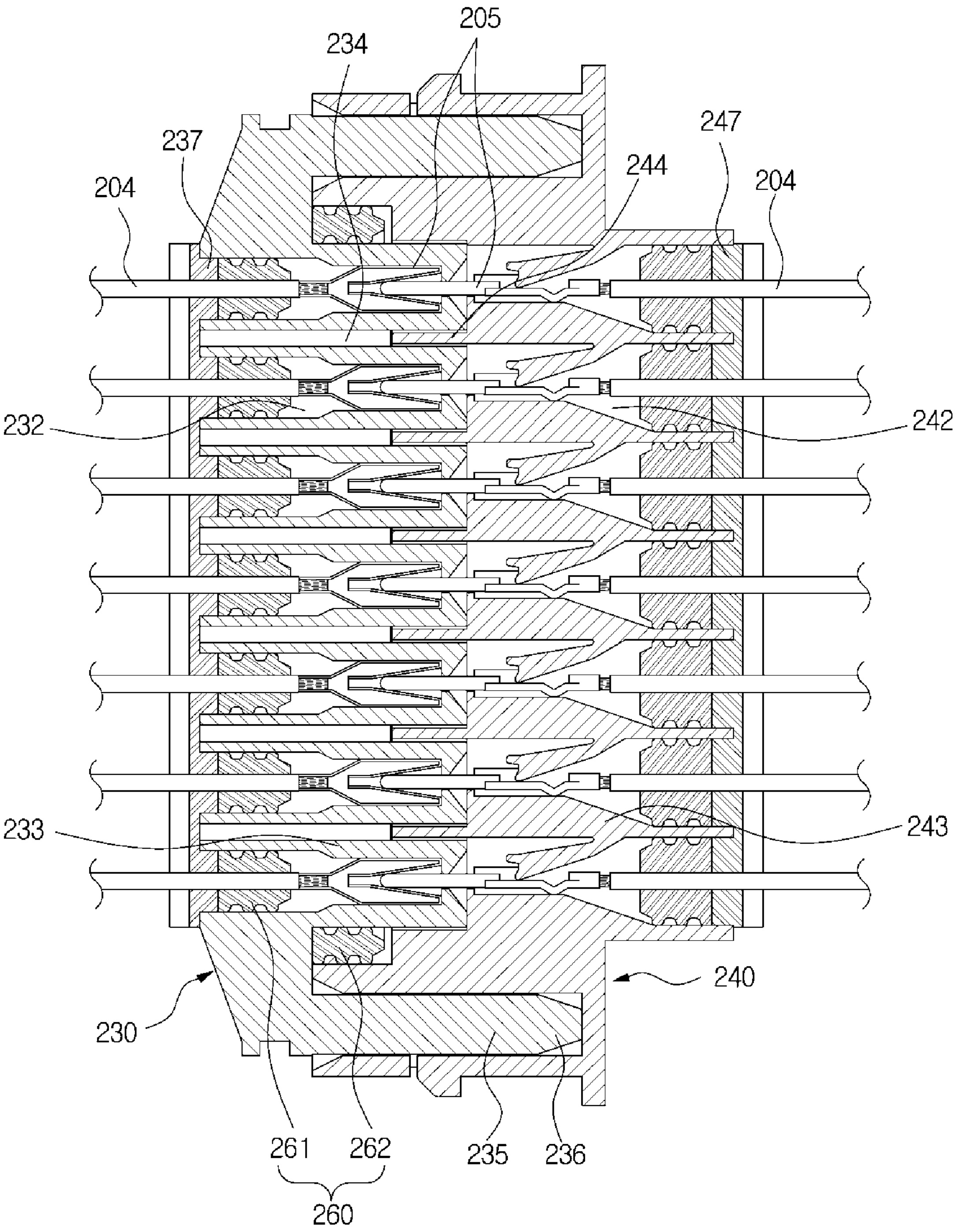
FIG. 24 is a sectional view illustrating a state where the mounting connector of the washing machine according to the third embodiment of the present disclosure is connected.

FIG. 22 is a view illustrating a cabinet of a washing machine according to a third embodiment of the present disclosure and a mounting connector mounted on a main door. FIG. 23 is a view illustrating a mounting connector of the washing machine according to the third embodiment of the present disclosure. FIG. 24 is a sectional view illustrating a state where the mounting connector of the washing machine according to the third embodiment of the present disclosure is connected.

Referring to FIGS. 22 to 24, a structure of the mounting connector of the washing machine according to the third embodiment of the present disclosure will be described. A duplicate description of the same configuration as the above-described embodiments will be omitted.

The washing machine may include a mounting connector 200 to supply power from a power source 117 provided in a cabinet 110 to a locking device 190 provided in a main door 140.

The mounting connector 200 may include a plug 230 mounted on one of the cabinet 110 and the main door 140 and a socket 240 mounted on the other of the cabinet 110 and the main door 140 and into which the plug 230 is inserted.

In this embodiment, the plug 230 is mounted on the main door 140 and the socket 240 is mounted on the cabinet 110. However, the present invention is not limited thereto and may be mounted in the opposite manner.

The plug 230 and the socket 240 may be interconnected or separated according to opening and closing of the main door 140. That is, when the main door 140 is opened, the plug 230 and the socket 240 are separated. When the main door 140 is closed, the plug 230 and the socket 240 can be connected.

The plug 230 may be connected to the locking device 190 by an electric wire 204 and the socket 240 may be connected to the power source 117 by the electric wire 204. As a result, when the main door 140 is closed and the plug 230 is connected to the socket 240, the power source 117 and the locking device 190 are connected to supply power to the locking device 190.

The plug 230 is provided with an insertion protrusion 231 and the socket 240 is provided with an insertion groove 241 so that the plug 230 can be inserted into the socket 240.

The plug 230 and the socket 240 each have wire receiving portions 232 and 242 for receiving the electric wires 204 and partition walls 233 and 243 located on both sides of the electric wire 204 to form the wire receiving portions 232 and 242.

A protrusion pin 244 protruding to form the insertion groove 241 is formed in the partition wall 243 of the socket 240 and a groove 234 in which the protrusion pin 244 is inserted is provided in the plug 230.

The mounting connector 200 may have a sealing member 260 for preventing moisture from penetrating into the mounting connector 200. The sealing member 260 includes a first sealing member 261 provided to enclose the electric wire 204 within the wire receiving portions 232 and 242, and a second sealing member 262 sealing between the plug 230 and the socket 240. The second sealing member 262 may be provided to surround the plug 230 on the outer side of the plug 230.

The mounting connector 200 may have guide portions 235 and 245 to guide the coupling. The guide portions 235 and 245 may include guide protrusions 235 and guide grooves 245 for receiving the guide protrusions 235. At an end of the guide protrusion 235, an inclined portion 236 having a reduced diameter is formed so that the guide protrusion 235 can be smoothly inserted into the guide groove 245.

The mounting connector 200 includes connection terminals 205 that are in contact with each other. Part of the connection terminals 205 may be power connection terminals for supplying electric power to the locking device 190 and part of them may be data connection terminals for detecting opening and closing of the main door 140.

That is, a washing machine 101 has a door open/close detection circuit unit for exchanging signals to detect open/close of the main door 140, and a control unit for receiving a signal from the door open/close detection circuit unit and determining whether the main door is open or closed. The connection terminal for transfer may form a part of the door open/close detection circuit unit.

When the plug 230 and the socket 240 are connected, not only the connection terminals for power transmission but also the connection terminals for data transmission are connected. When the plug 230 and the socket 240 are separated, not only the connection terminal for power transmission but also the connection terminal for data transmission can be disconnected.

Accordingly, the door open/close detection circuit unit outputs different signals depending on the connection and disconnection state of the plug 230 and the socket 240, and accordingly, the control unit can determine whether the main door 140 is open or closed.

As a result, the mounting connector 200 according to the embodiment of the present disclosure may also serve to detect whether the main door 140 is open or closed, in addition to supplying power to the locking device 190.

Figure 25:
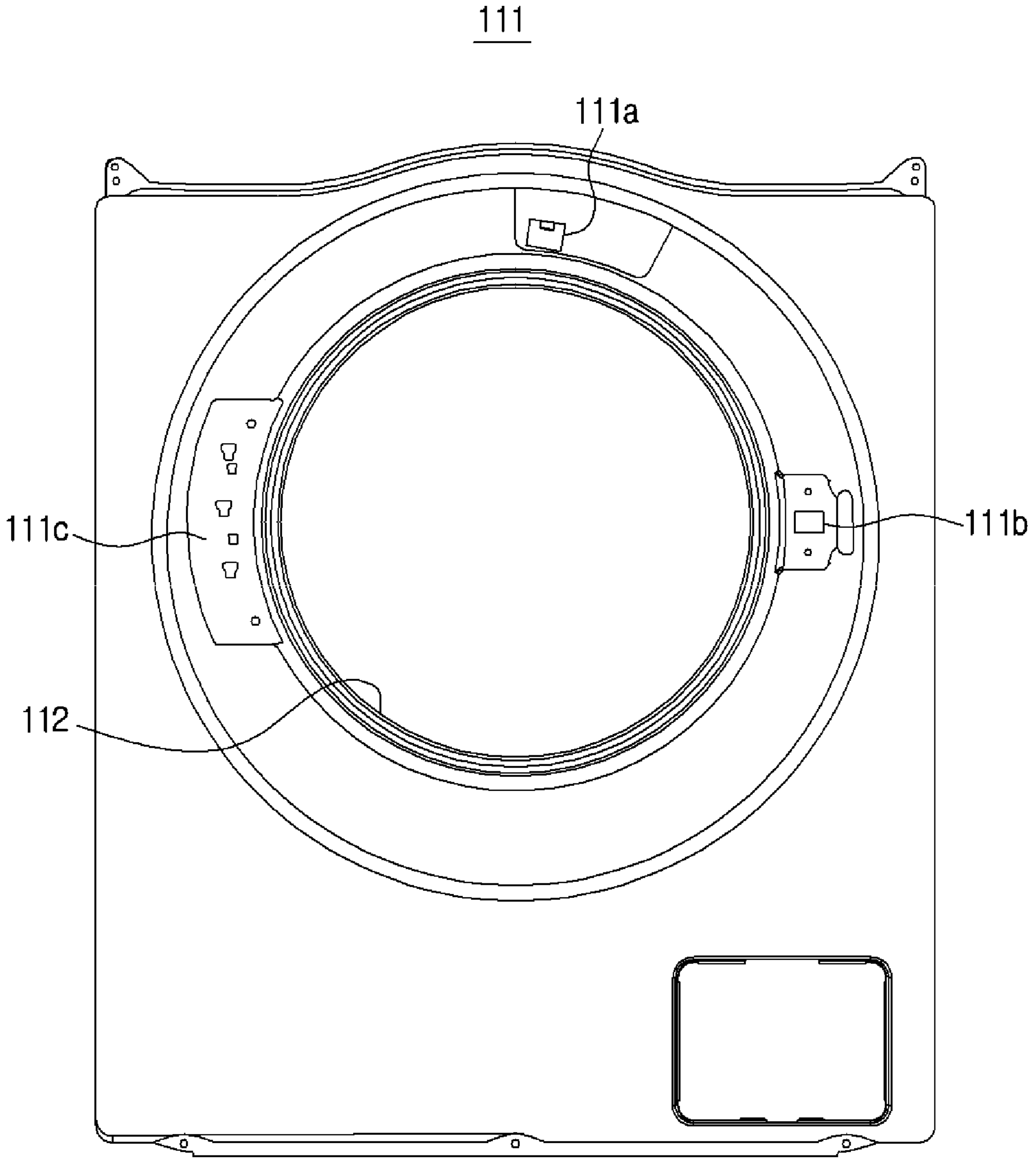
FIG. 25 is a front view of a cabinet front plate of a washing machine according to a fourth embodiment of the present disclosure.
Figure 26:
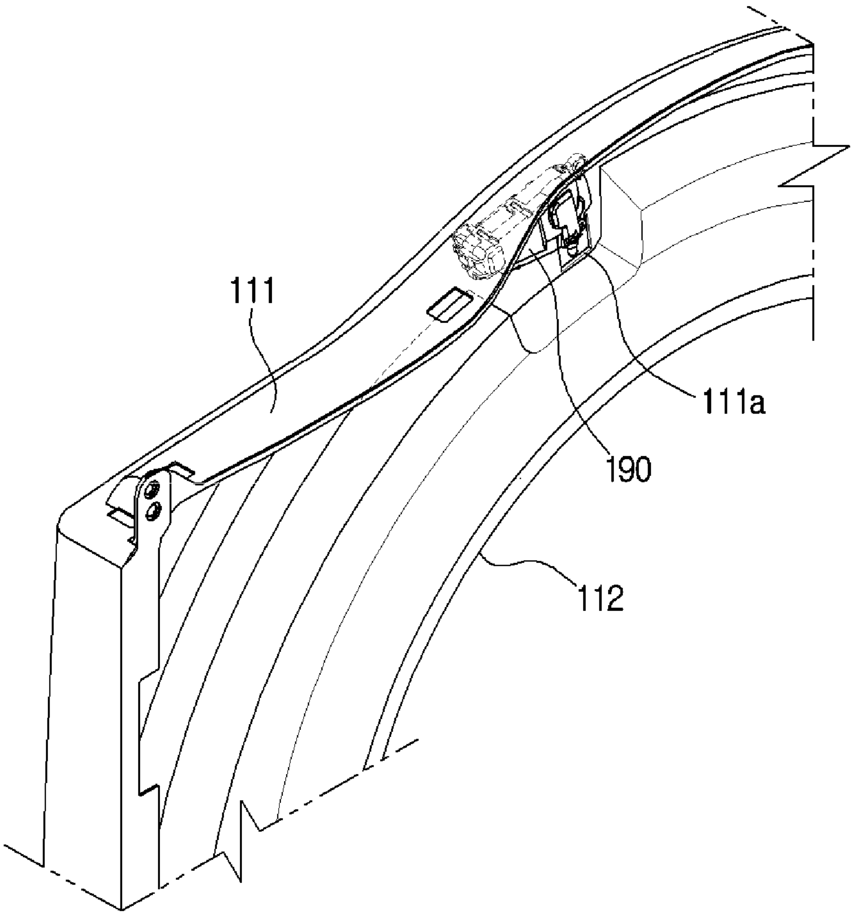
FIG. 26 is a perspective view illustrating a state in which a locking device is mounted on a rear surface of the cabinet front plate of the washing machine according to the fourth embodiment of the present disclosure.
Figure 27:
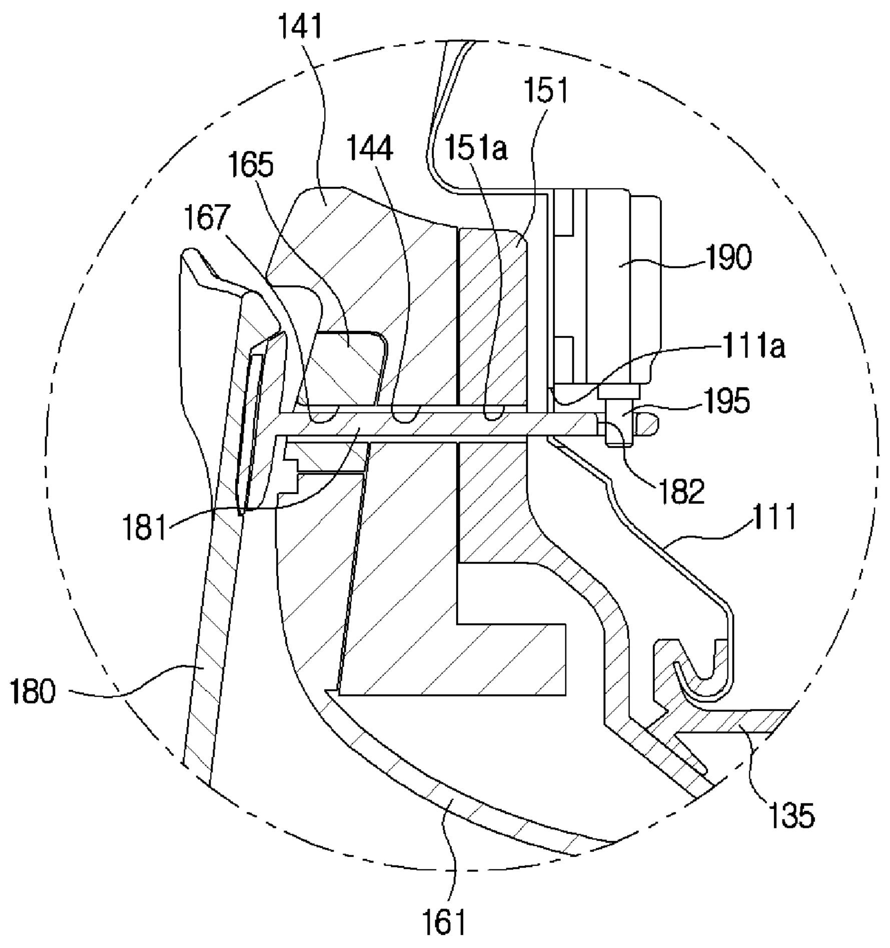
FIG. 27 is a sectional view illustrating a locking structure of an auxiliary door of the washing machine according to the fourth embodiment of the present disclosure.

FIG. 25 is a front view of a cabinet front plate of a washing machine according to a fourth embodiment of the present disclosure. FIG. 26 is a perspective view illustrating a state in which a locking device is mounted on a rear surface of the cabinet front plate of the washing machine according to the fourth embodiment of the present disclosure. FIG. 27 is a sectional view illustrating a locking structure of an auxiliary door of the washing machine according to the fourth embodiment of the present disclosure.

Referring to FIGS. 25 to 27, an auxiliary door locking structure of the washing machine according to the fourth embodiment of the present disclosure will be described. A duplicate description of the same configuration as the above-described embodiments will be omitted.

The locking device 190 for locking the auxiliary door 180 in the second and third embodiments is provided in the main door 140 so that a mechanism is required in which electric power is transmitted from the power source 117 provided in the cabinet 110 to the locking device 190 provided in the main door 140.

Alternatively, a locking device 190 according to the fourth embodiment of the present disclosure is provided in a cabinet 110, not a main door 140. Specifically, the locking device 190 can be mounted on the rear surface of a cabinet front plate 111. Therefore, a latch 181 of an auxiliary door 180 must penetrate through the main door 140 and the cabinet front plate 111 in order to access the locking device 190.

Therefore, a chute 165 of the main door 140, a door cover 141 of the main door 140, a door holder 151 of the main door 140, and the cabinet front plate 111 are respectively provided with latch passing holes 167, 144, 151*a*, and 111*a*. However, the chute 165 may be provided to deviate from the movement path of the latch 181, so that the chute 165 may not be provided with the latch passing hole 167.

The unillustrated reference numeral 111*b* in FIG. 25 is a through hole through which a hook 159 (FIG. 12) of a main door locking device 158 (FIG. 12) passes.

FIGS. 28 to 31 are views for explaining a locking structure of an auxiliary door of a washing machine according to a fifth embodiment of the present disclosure and views sequentially showing a process in which the auxiliary door is locked.

The locking structure of the auxiliary door of the washing machine according to the fifth embodiment of the present disclosure will be described with reference to FIGS. 28 to 31. A duplicate description of the same configuration as the above embodiment will be omitted.

In the washing machine of the fifth embodiment, a locking device 190 is provided on the back surface of a cabinet front plate 111, like the washing machine of the fourth embodiment. The difference from the fourth embodiment is that a latch 181 of an auxiliary door 180 does not directly approach the locking device 190 but presses a lever 310 provided on a main door 140, and the lever 310 approaches the locking device 190.

The auxiliary door 180 includes a push rod 300 and the main door 140 is provided with the lever 310 which is pressed and rotated by a push rod 300.

The lever 310 includes a rotating shaft portion 311, an input portion 312 extending in one direction in the rotating shaft portion 311 and pressed by the push rod 300, a restricting portion 313 formed with a restricting hole 314, and a locking portion 315 extending in another direction in the rotating shaft portion 311 and locking the auxiliary door 180 by restricting the push rod 300.

A locking bar 195 of the locking device 190 is inserted into the restricting hole 314 of the restricting portion 313 so that the lever 310 can be restrained.

The push rod 300 includes a stem portion 301 protruding rearward of the auxiliary door 180, a pressing portion 302 that presses the input portion 312 of the lever 310 and rotates the lever 310 in the process of closing the auxiliary door 180, and an interference portion 303 which interferes with the locking portion 315 of the lever 310.

Figure 28:
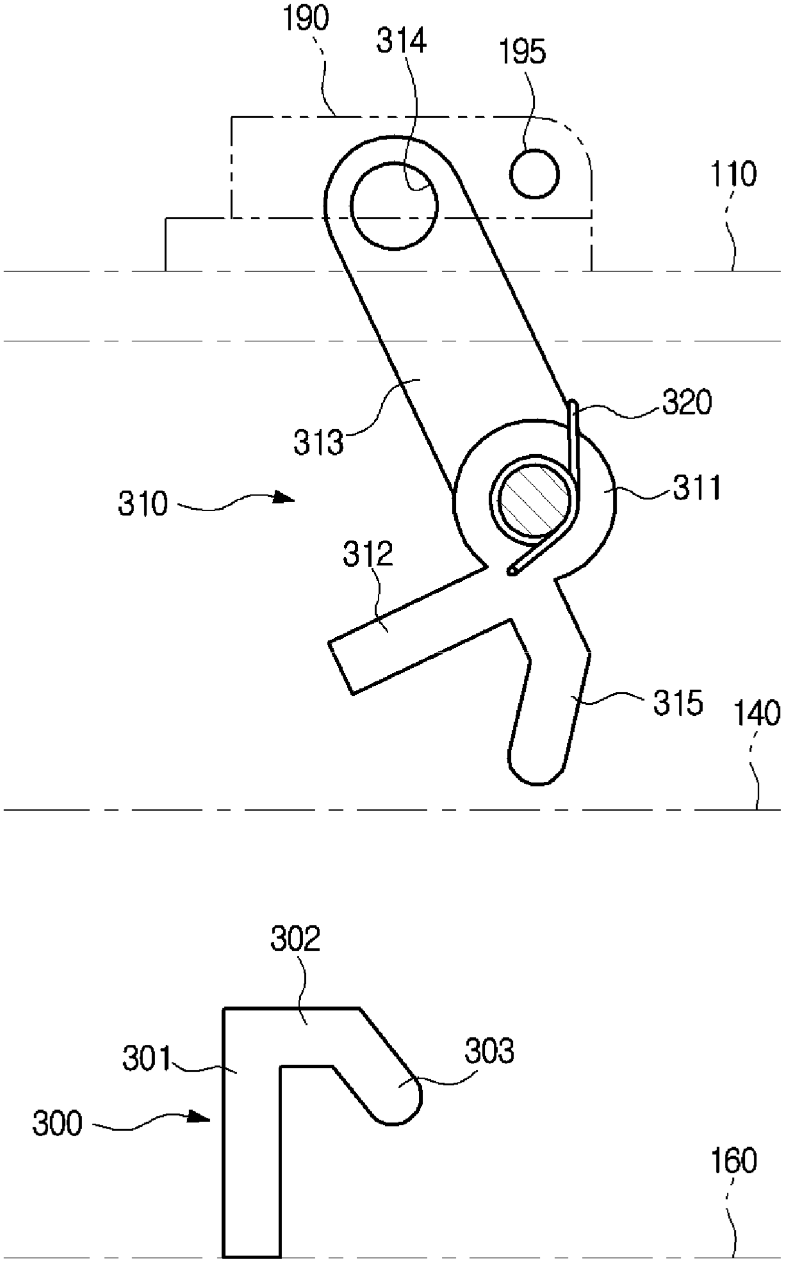
FIGS. 28 to 31 are views for explaining a locking structure of an auxiliary door of a washing machine according to a fifth embodiment of the present disclosure.
Figure 29:
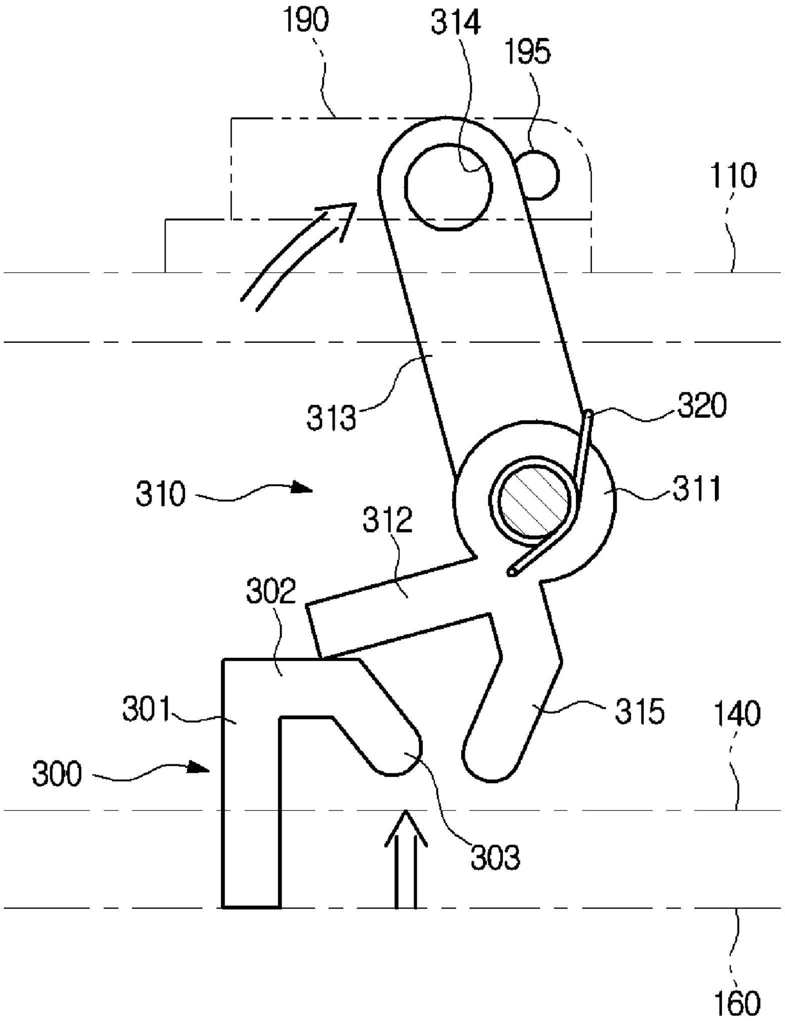
Figure 30:
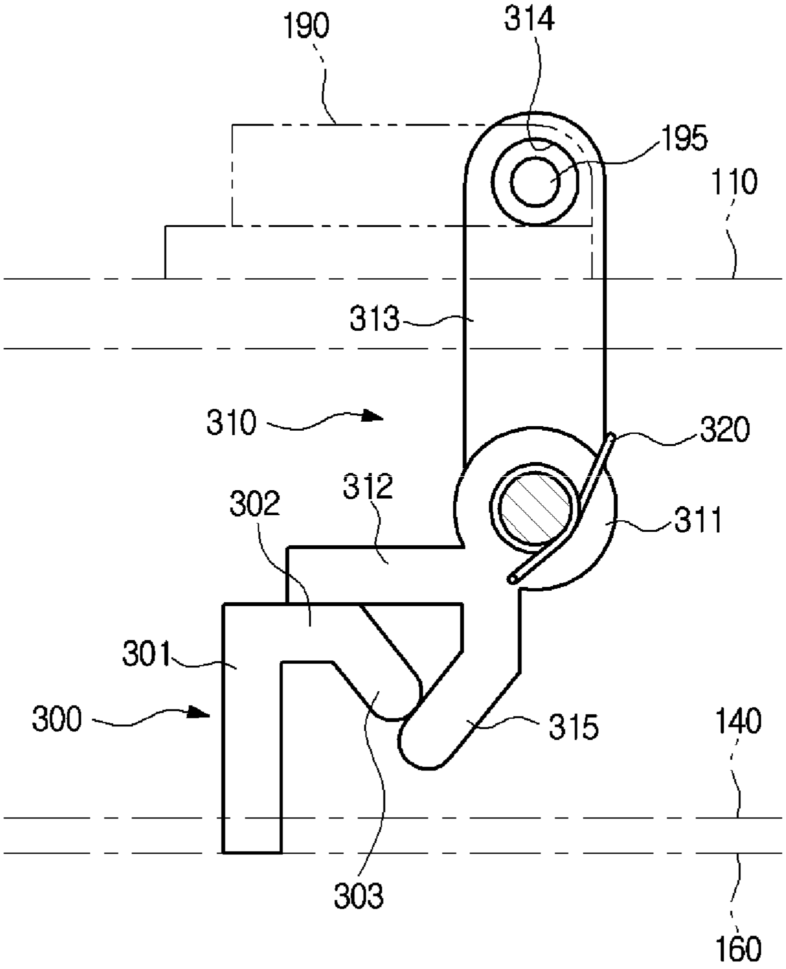

As shown in FIGS. 28 to 30, when the push rod 300 presses the lever 310 to rotate the lever 310 in the process of closing the auxiliary door 180, the locking hole 314 of the lever 310 moves to a position corresponding to the locking bar 195 of the locking device 190.

Figure 31:
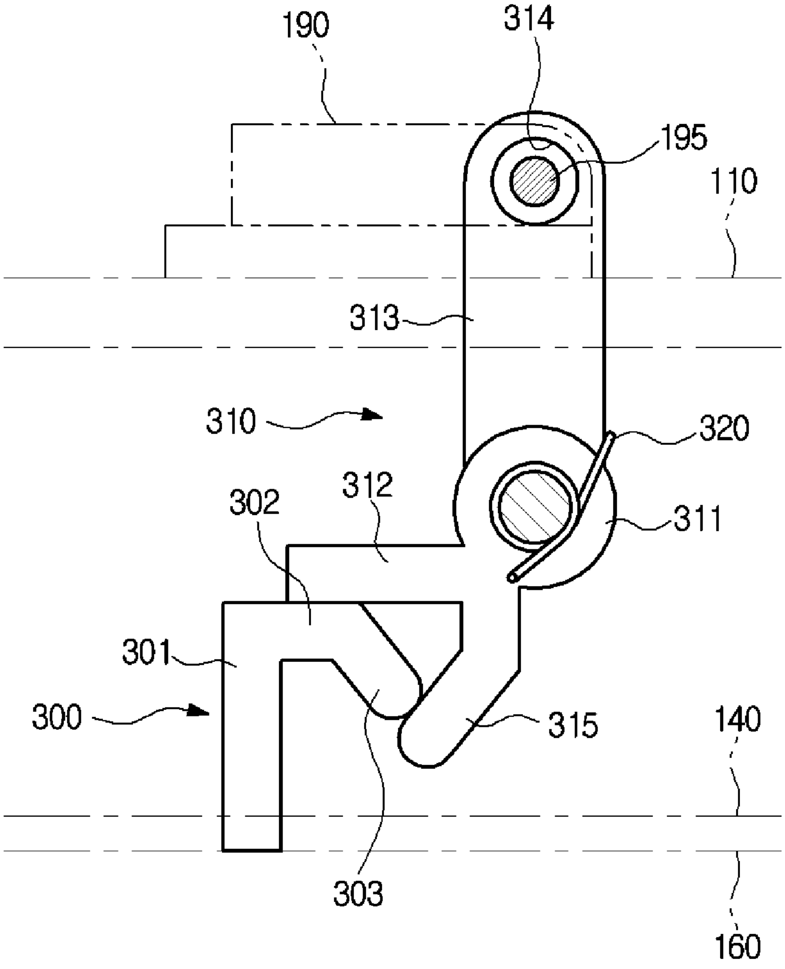

Next, as shown in FIG. 31, when the locking device 190 is actuated and the locking bar 195 moves into the restricting hole 314, the lever 310 is restrained from rotating.

The auxiliary door 180 is also locked because the interference portion 303 of the push rod 300 is interfered by the locking portion 315 in a state where the lever 310 is prevented from rotating.

In order to release the locking of the auxiliary door 180, the locking device 190 is operated to release the locking bar 195 from the restricting hole 314. When the locking of the auxiliary door 180 is released and the auxiliary door 180 is opened, the lever 310 can return to the original position by the elastic force of the elastic member 320.

Figure 32:
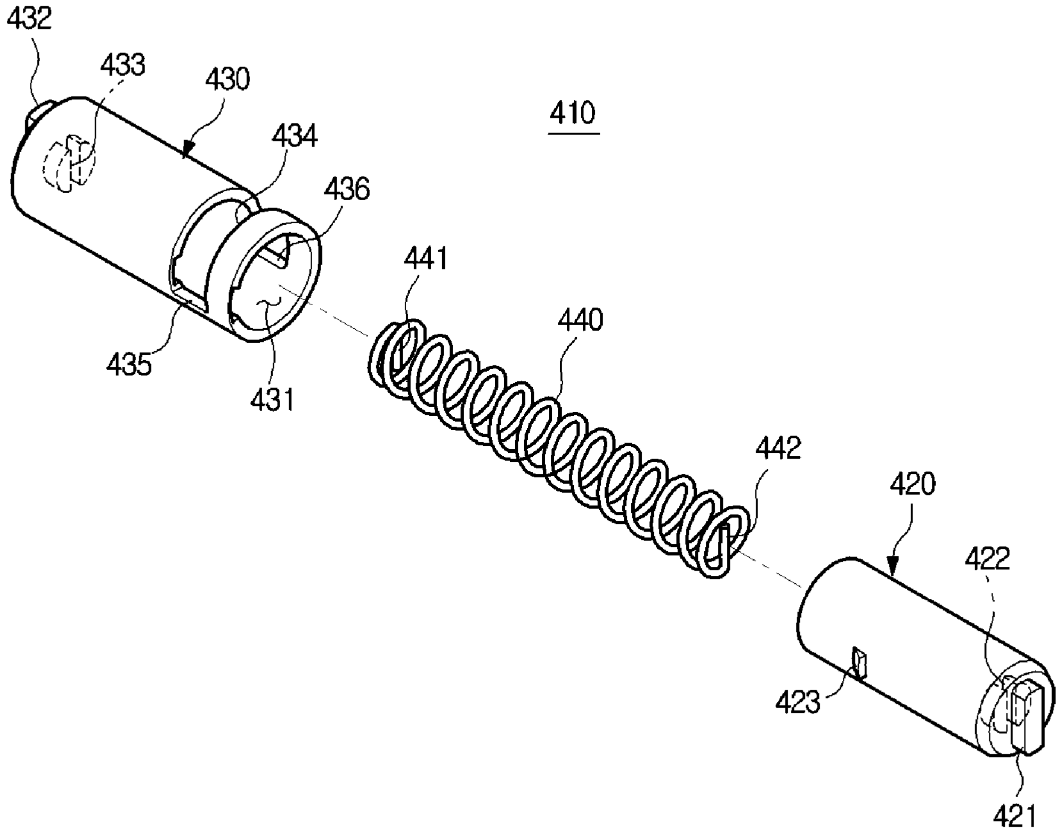
FIG. 32 is an exploded view of the structure of a shock absorber of a hinge unit of the auxiliary door of the washing machine according to the second embodiment of the present disclosure.
Figure 33:
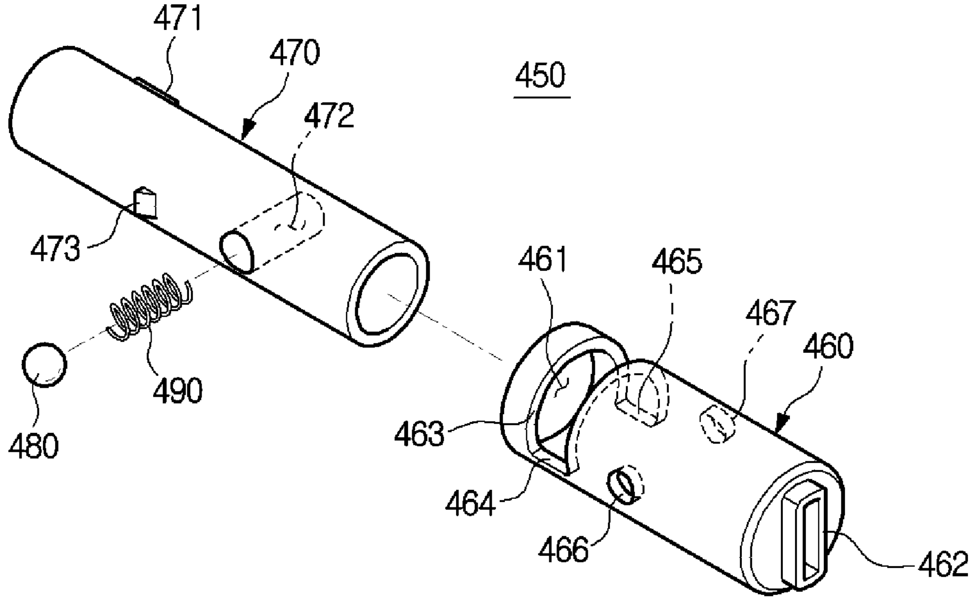
FIG. 33 is an exploded view of the structure of a fixing unit of the hinge unit of the auxiliary door of the washing machine according to the second embodiment of the present disclosure.

FIG. 32 is an exploded view of the structure of a shock absorber of a hinge unit of the auxiliary door of the washing machine according to the second embodiment of the present disclosure. FIG. 33 is an exploded view of the structure of a fixing unit of the hinge unit of the auxiliary door of the washing machine according to the second embodiment of the present disclosure.

Referring to FIGS. 32 to 33, the hinge unit of the auxiliary door of the washing machine according to the second embodiment of the present disclosure will be described. It goes without saying that the following hinge unit can be applied to the auxiliary door of the washing machine of another embodiment.

The hinge unit 400 supports the auxiliary door 180 to rotate. The hinge unit 400 may include a shock absorber 410 that buffers an impact generated when the auxiliary door 180 is opened and closed.

The shock absorber 410 includes a rotating shaft 430 rotated together with the auxiliary door 180 having a hollow portion 431, a fixed shaft 420 inserted into the hollow portion 431 and coupled to the main door 140, and a buffer spring 440 connected to the rotating shaft 430 and the fixed shaft 420 to apply an elastic force to the rotating shaft 430.

The rotating shaft 430 may have a cylindrical shape having the hollow portion 431. The rotating shaft 430 may have an auxiliary door coupling portion 432 for coupling with the auxiliary door 180 and a spring support portion 433 to which one end 441 of the buffer spring 440 is coupled.

The rotating shaft 430 may have a stopper groove 434 and stopper surfaces 435 and 436 for limiting the rotation range of the auxiliary door 180.

The fixed shaft 420 has a cylindrical shape with a smaller diameter than the rotating shaft 430 and can be inserted into the rotating shaft 430. The fixed shaft 420 may have a main door coupling portion 421 for coupling with the main door 140 and a spring support portion 422 to which another end 442 of the buffer spring 440 is coupled.

Further, the fixed shaft 420 may have a stopper protrusion 423 for limiting the rotation range of the auxiliary door 180. The stopper protrusion 423 can move inside the stopper groove 434 when the rotating shaft 430 rotates. The stopper protrusion 423 may interfere with the stopper surfaces 435 and 436 to prevent the auxiliary door 180 from further rotating when the auxiliary door 180 is opened or closed at the maximum angle.

Although a coil spring is used as the buffer spring 440 in the present embodiment, the present invention is not limited to this, and a single elastic member such as a torsion spring or a leaf spring capable of exerting an elastic force can be used.

The buffer spring 440 can be disposed such that the auxiliary door 180 is in an initial state where the elastic force is zero when the auxiliary door 180 is at a substantially middle angle between the maximum opening angle and the maximum closing angle. In this case, the buffer spring 440 may exert an elastic force so that the auxiliary door 180 rotates in the direction of the intermediate angle when the angle of the auxiliary door 180 is increased or decreased at an intermediate angle. That is, the buffer spring 440 can perform the damping function both when the auxiliary door 180 is opened and closed.

Alternatively, the buffer spring 440 may be arranged to be in the initial state when the auxiliary door 180 is at the maximum opening angle, or may be placed in the initial state when the auxiliary door 180 is at the maximum closing angle.

When the buffer spring 440 is arranged to be in the initial state when the auxiliary door 180 is at the maximum opening angle, the buffer spring 440 always exerts the elastic force in the direction of opening the auxiliary door 180. The damping function is performed when the auxiliary door 180 is closed, and the auto opening function is performed when the auxiliary door 180 is opened. That is, the buffer spring 440 performs a damping function when the auxiliary door 180 is closed, and conversely, performs the auto-opening function when the auxiliary door 180 is opened.

When the buffer spring 440 is placed in the initial state when the auxiliary door 180 is at the maximum closing angle, the buffer spring 440 always exerts an elastic force in the direction of closing the auxiliary door 180. That is, the damping function is performed when the auxiliary door 180 is opened and the auto closing function is performed when the auxiliary door 180 is closed.

The hinge unit 400 may include a fixing unit 450 for fixing the auxiliary door 180 when the auxiliary door 180 is opened and closed at a maximum angle.

The fixing unit 450 includes a rotating shaft 460 rotatable together with the auxiliary door 180 having a hollow portion 461 formed with engaging holes 466 and 467 on a circumferential surface thereof, a fixed shaft 470 inserted into the hollow portion 461 and coupled to the main door 140, an engaging member 480 inserted into the engaging holes 466 and 467 to fix the auxiliary door 180 when the auxiliary door 180 is opened or closed at a predetermined angle, and an engaging spring 490 that applies an elastic force to the engaging member 480 in the direction of the engaging holes 466 and 467.

The rotating shaft 460 may have a cylindrical shape having the hollow portion 461. The rotating shaft 460 has an auxiliary door coupling portion 462 for engaging with the auxiliary door 180, a stopper groove 463 for limiting the rotation range of the auxiliary door 180, and stopper surfaces 464 and 465.

The fixed shaft 470 has a cylindrical shape smaller in diameter than the rotating shaft 460 and can be inserted into the rotating shaft 460. The fixed shaft 470 may have a main door coupling portion 471 for engagement with the main door 140 and a stopper protrusion 473 for limiting the rotation range of the auxiliary door 180. The stopper protrusion 473 can move inside the stopper groove 463 when the rotating shaft 460 rotates. The stopper protrusion 473 may interfere with the stopper surfaces 464 and 465 when the auxiliary door 180 is opened or closed at the maximum angle so that the auxiliary door 180 can no longer be rotated.

The engaging member 480 may have a spherical shape so that the engaging member 480 can be easily detached from the engaging holes 466 and 467 when the user pulls or pushes the auxiliary door 180 even after being inserted into the engaging holes 466 and 467.

A click sound is generated when the engaging member 480 is inserted into the engaging holes 466 and 467 so that the user can easily recognize the opening and closing of the auxiliary door 180.

With such a configuration, it is possible to mitigate the impact when the auxiliary door 180 is opened and closed, and to improve the usability and the sensibility of the auxiliary door 180.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A hinge comprising:

a cabinet coupling portion, a hinge arm coupled to the cabinet coupling portion, the hinge arm extends perpendicularly from a lengthwise outer surface of the cabinet coupling portion, a hinge shaft protruding from the hinge arm, a wire passage which is formed to be recessed on a surface of the hinge arm to accommodate an electric wire and having a curved shape extending from the hinge shaft to the cabinet coupling portion, and a wire cover detachably coupled to the wire passage, the wire cover having a shape corresponding the curved shape of the wire passage and covering an entire open area of the wire passage to seal the wire passage and to prevent the electric wire accommodated in the wire passage from being exposed, wherein the wire cover forms a portion of an exterior of the hinge arm when the wire cover is coupled to the wire passage, wherein the electric wire comprises a first wire connected to a first electric component and having a first connector, and a second wire connected to a second electric component, passing through the wire passage, and having a second connector detachably couplable to the first connector, and wherein the hinge further comprises a connector receiving groove formed on a back surface of the cabinet coupling portion to receive the first connector and the second connector.

2. The hinge of claim 1, further comprising a fixed rib protruding from an inner surface of the connector receiving groove to fix the first connector and the second connector.

3. The hinge of claim 1, further comprising a moisture permeation preventing rib formed on an upper side of the connector receiving groove to prevent moisture from penetrating into the first connector and the second connector.

4. The hinge of claim 1, wherein the hinge arm comprises a first hinge arm and a second hinge arm positioned below the first hinge arm, and the wire passage is formed at the first hinge arm.

5. The hinge of claim 1, wherein the hinge arm extends from the cabinet coupling portion to the hinge shaft.

6. The hinge of claim 1, wherein the cabinet coupling portion has at least two hinge arms coupled thereto.

7. The hinge of claim 1, wherein a lengthwise portion of the hinge shaft is positioned parallel to the lengthwise outer surface of the cabinet coupling portion.

* * * * *